(12) United States Patent
Sarkis et al.

(10) Patent No.: US 11,108,526 B2
(45) Date of Patent: Aug. 31, 2021

(54) CHANNEL QUALITY INDICATOR (CQI) REPORTING FOR ULTRA-RELIABLE LOW LATENCY COMMUNICATIONS (URLLC)

(71) Applicant: QUALCOMM Incorporated, San Diego, CA (US)

(72) Inventors: Gabi Sarkis, San Diego, CA (US); Jing Jiang, San Diego, CA (US); Wanshi Chen, San Diego, CA (US); Wei Yang, San Diego, CA (US); Ying Wang, San Diego, CA (US); Chih-Ping Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 16/370,594

(22) Filed: Mar. 29, 2019

(65) Prior Publication Data
US 2019/0305911 A1    Oct. 3, 2019

Related U.S. Application Data

(60) Provisional application No. 62/651,622, filed on Apr. 2, 2018.

(51) Int. Cl.
*H04L 5/00* (2006.01)
*H04L 1/00* (2006.01)
*H04W 52/12* (2009.01)

(52) U.S. Cl.
CPC .......... *H04L 5/0057* (2013.01); *H04L 1/0026* (2013.01); *H04W 52/12* (2013.01)

(58) Field of Classification Search
None
See application file for complete search history.

(56) References Cited

U.S. PATENT DOCUMENTS

| | | | |
|---|---|---|---|
| 2004/0110521 A1* | 6/2004 | Soldani | H04L 1/18 455/509 |
| 2011/0110251 A1* | 5/2011 | Krishnamurthy | H04W 72/082 370/252 |
| 2015/0288483 A1* | 10/2015 | Sun | H04L 1/0017 370/329 |
| 2016/0262167 A1* | 9/2016 | Lan | H04L 1/0025 |

(Continued)

FOREIGN PATENT DOCUMENTS

WO    2018044849 A1    3/2018

OTHER PUBLICATIONS

Partial International Search Report—PCT/US2019/025167—ISA/EPO—dated Jun. 3, 2019.

(Continued)

*Primary Examiner* — Lonnie V Sweet
(74) *Attorney, Agent, or Firm* — Harrity & Harrity, LLP/Qualcomm

(57) ABSTRACT

Various aspects of the present disclosure generally relate to wireless communication. In some aspects, a user equipment may determine a block error rate (BLER) target for communications associated with the user equipment; determine a resource allocation pattern for transmission of channel state information reference signals (CSI-RS) based at least in part on the BLER target; and monitor one or more resources, indicated by the resource allocation pattern, for the CSI-RS. Numerous other aspects are provided.

30 Claims, 14 Drawing Sheets

(56) References Cited

U.S. PATENT DOCUMENTS

| | | | |
|---|---|---|---|
| 2016/0278103 A1 | 9/2016 | Kazmi et al. | |
| 2016/0285536 A1* | 9/2016 | Gutierrez | H04B 7/0626 |
| 2017/0126300 A1* | 5/2017 | Park | H04W 4/10 |
| 2017/0288808 A1* | 10/2017 | Blankenship | H04L 1/08 |
| 2018/0269934 A1* | 9/2018 | Kim | H04W 72/0413 |
| 2020/0169902 A1* | 5/2020 | Yasukawa | H04L 5/0057 |
| 2020/0328796 A1* | 10/2020 | Turtinen | H04W 76/28 |

OTHER PUBLICATIONS

International Search Report and Written Opinion—PCT/US2019/025167—ISA/EPO—dated Jul. 25, 2019.

* cited by examiner

CHANNEL QUALITY INDICATOR (CQI) REPORTING FOR ULTRA-RELIABLE LOW LATENCY COMMUNICATIONS (URLLC)

CROSS-REFERENCE TO RELATED APPLICATIONS UNDER 35 U.S.C. § 119

This application claims priority to U.S. Provisional Patent Application No. 62/651,622, filed on Apr. 2, 2018, entitled "TECHNIQUES AND APPARATUSES FOR CHANNEL QUALITY INDICATOR (CQI) REPORTING FOR ULTRA-RELIABLE LOW LATENCY COMMUNICATIONS (URLLC)," which is hereby expressly incorporated by reference herein.

FIELD OF THE DISCLOSURE

Aspects of the present disclosure generally relate to wireless communication, and more particularly to techniques and apparatuses for channel quality indicator (CQI) reporting for ultra-reliable low latency communications (URLLC).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining a block error rate (BLER) target for communications associated with the UE; determining a resource allocation pattern for transmission of channel state information reference signals (CSI-RS) based at least in part on the BLER target; and monitoring one or more resources, indicated by the resource allocation pattern, for the CSI-RS.

In some aspects, a UE for wireless communication may include memory, a transmitter, and one or more processors operatively coupled to the memory. The memory and the one or more processors may be configured to determine a block error rate (BLER) target for communications associated with the UE; determine a resource allocation pattern for transmission of channel state information reference signals (CSI-RS) based at least in part on the BLER target; and monitor one or more resources, indicated by the resource allocation pattern, for the CSI-RS.

In some aspects, a non-transitory computer-readable medium may store one or more instructions for wireless communication. The one or more instructions, when executed by one or more processors of a UE, may cause the one or more processors to determine a block error rate (BLER) target for communications associated with the UE; determine a resource allocation pattern for transmission of channel state information reference signals (CSI-RS) based at least in part on the BLER target; and monitor one or more resources, indicated by the resource allocation pattern, for the CSI-RS.

In some aspects, an apparatus for wireless communication may include means for determining a block error rate (BLER) target for communications associated with the apparatus; means for determining a resource allocation pattern for transmission of channel state information reference signals (CSI-RS) based at least in part on the BLER target; and means for monitoring one or more resources, indicated by the resource allocation pattern, for the CSI-RS.

In some aspects, a method of wireless communication, performed by a base station, may include determining a block error rate (BLER) target for communications associated with the base station; determining at least one of a transmission power or a resource allocation pattern for transmission of channel state information reference signals (CSI-RS) based at least in part on the BLER target; and transmitting the CSI-RS using at least one of the transmission power or the resource allocation pattern.

In some aspects, a base station for wireless communication may include memory and one or more processors operatively coupled to the memory. The memory and the one or more processors may be configured to determine a block error rate (BLER) target for communications associated with the base station; determine at least one of a transmission power or a resource allocation pattern for transmission of channel state information reference signals (CSI-RS) based at least in part on the BLER target; and transmit the CSI-RS using at least one of the transmission power or the resource allocation pattern.

In some aspects, a non-transitory computer-readable medium may store one or more instructions for wireless communication. The one or more instructions, when executed by one or more processors of a base station, may cause the one or more processors to determine a block error rate (BLER) target for communications associated with the base station; determine at least one of a transmission power or a resource allocation pattern for transmission of channel state information reference signals (CSI-RS) based at least in part on the BLER target; and transmit the CSI-RS using at least one of the transmission power or the resource allocation pattern.

In some aspects, an apparatus for wireless communication may include means for determining a block error rate (BLER) target for communications associated with the apparatus; means for determining at least one of a transmission power or a resource allocation pattern for transmission of channel state information reference signals (CSI-RS) based at least in part on the BLER target; and means for transmitting the CSI-RS using at least one of the transmission power or the resource allocation pattern.

In some aspects, a method of wireless communication, performed by a user equipment (UE), may include determining a block error rate (BLER) target for communications associated with the UE; determining a number of bits to be used to indicate a channel quality indicator (CQI) index based at least in part on the BLER target; and transmitting the CQI index using the number of bits.

In some aspects, a UE for wireless communication may include memory and one or more processors operatively coupled to the memory. The memory and the one or more processors may be configured to determine a block error rate (BLER) target for communications associated with the UE; determine a number of bits to be used to indicate a channel quality indicator (CQI) index based at least in part on the BLER target; and transmit the CQI index using the number of bits.

In some aspects, a non-transitory computer-readable medium may store one or more instructions for wireless communication. The one or more instructions, when executed by one or more processors of a UE, may cause the one or more processors to determine a block error rate (BLER) target for communications associated with the UE; determine a number of bits to be used to indicate a channel quality indicator (CQI) index based at least in part on the BLER target; and transmit the CQI index using the number of bits.

In some aspects, an apparatus for wireless communication may include means for determining a block error rate (BLER) target for communications associated with the apparatus; means for determining a number of bits to be used to indicate a channel quality indicator (CQI) index based at least in part on the BLER target; and means for transmitting the CQI index using the number of bits.

In some aspects, a method of wireless communication, performed by a base station, may include determining a block error rate (BLER) target for communications associated with the base station; determining a number of bits to be used to indicate a channel quality indicator (CQI) index based at least in part on the BLER target; receiving the CQI index; and decoding the CQI index based at least in part on the determined number of bits.

In some aspects, a base station for wireless communication may include memory and one or more processors operatively coupled to the memory. The memory and the one or more processors may be configured to determine a block error rate (BLER) target for communications associated with the base station; determine a number of bits to be used to indicate a channel quality indicator (CQI) index based at least in part on the BLER target; receive the CQI index; and decode the CQI index based at least in part on the determined number of bits.

In some aspects, a non-transitory computer-readable medium may store one or more instructions for wireless communication. The one or more instructions, when executed by one or more processors of a base station, may cause the one or more processors to determine a block error rate (BLER) target for communications associated with the base station; determine a number of bits to be used to indicate a channel quality indicator (CQI) index based at least in part on the BLER target; receive the CQI index; and decode the CQI index based at least in part on the determined number of bits.

In some aspects, an apparatus for wireless communication may include means for determining a block error rate (BLER) target for communications associated with the apparatus; means for determining a number of bits to be used to indicate a channel quality indicator (CQI) index based at least in part on the BLER target; means for receiving the CQI index; and means for decoding the CQI index based at least in part on the determined number of bits.

In some aspects, a method of wireless communication, performed by a user equipment (UE), may include determining a block error rate (BLER) target for communications associated with the UE; determining a reporting timeline, associated with reporting a channel quality indicator (CQI) report, based at least in part on the BLER target; and transmitting the CQI report according to the reporting timeline.

In some aspects, a UE for wireless communication may include memory and one or more processors operatively coupled to the memory. The memory and the one or more processors may be configured to determine a block error rate (BLER) target for communications associated with the UE; determine a reporting timeline, associated with reporting a channel quality indicator (CQI) report, based at least in part on the BLER target; and transmit the CQI report according to the reporting timeline.

In some aspects, a non-transitory computer-readable medium may store one or more instructions for wireless communication. The one or more instructions, when executed by one or more processors of a UE, may cause the one or more processors to determine a block error rate (BLER) target for communications associated with the UE; determine a reporting timeline, associated with reporting a channel quality indicator (CQI) report, based at least in part on the BLER target; and transmit the CQI report according to the reporting timeline.

In some aspects, an apparatus for wireless communication may include means for determining a block error rate (BLER) target for communications associated with the apparatus; means for determining a reporting timeline, associated with reporting a channel quality indicator (CQI) report, based at least in part on the BLER target; and means for transmitting the CQI report according to the reporting timeline.

In some aspects, a method of wireless communication, performed by a base station, may include determining a block error rate (BLER) target for communications associated with the base station; determining a reporting timeline, associated with reporting a channel quality indicator (CQI) report, based at least in part on the BLER target; and monitoring for the CQI report according to the reporting timeline.

In some aspects, a base station for wireless communication may include memory and one or more processors operatively coupled to the memory. The memory and the one or more processors may be configured to determine a block error rate (BLER) target for communications associated with the base station; determine a reporting timeline, associated with reporting a channel quality indicator (CQI) report, based at least in part on the BLER target; and monitor for the CQI report according to the reporting timeline.

In some aspects, a non-transitory computer-readable medium may store one or more instructions for wireless communication. The one or more instructions, when executed by one or more processors of a base station, may cause the one or more processors to determine a block error rate (BLER) target for communications associated with the base station; determine a reporting timeline, associated with reporting a channel quality indicator (CQI) report, based at least in part on the BLER target; and monitor for the CQI report according to the reporting timeline.

In some aspects, an apparatus for wireless communication may include means for determining a block error rate (BLER) target for communications associated with the apparatus; means for determining a reporting timeline, associated with reporting a channel quality indicator (CQI) report, based at least in part on the BLER target; and means for monitoring for the CQI report according to the reporting timeline.

In some aspects, a method of wireless communication, performed by a user equipment (UE), may include determining a block error rate (BLER) target for communications associated with the UE; determining at least one of a number of bits to be used to indicate a channel quality indicator (CQI) index or a reporting timeline associated with reporting the CQI index based at least in part on the BLER target; and transmitting the CQI index using at least one of the number of bits or the reporting timeline.

In some aspects, a UE for wireless communication may include memory and one or more processors operatively coupled to the memory. The memory and the one or more processors may be configured to determine a block error rate (BLER) target for communications associated with the UE; determine at least one of a number of bits to be used to indicate a channel quality indicator (CQI) index or a reporting timeline associated with reporting the CQI index based at least in part on the BLER target; and transmit the CQI index using at least one of the number of bits or the reporting timeline.

In some aspects, a non-transitory computer-readable medium may store one or more instructions for wireless communication. The one or more instructions, when executed by one or more processors of a UE, may cause the one or more processors to determine a block error rate (BLER) target for communications associated with the UE; determine at least one of a number of bits to be used to indicate a channel quality indicator (CQI) index or a reporting timeline associated with reporting the CQI index based at least in part on the BLER target; and transmit the CQI index using at least one of the number of bits or the reporting timeline.

In some aspects, an apparatus for wireless communication may include means for determining a block error rate (BLER) target for communications associated with the apparatus; means for determining at least one of a number of bits to be used to indicate a channel quality indicator (CQI) index or a reporting timeline associated with reporting the CQI index based at least in part on the BLER target; and means for transmitting the CQI index using at least one of the number of bits or the reporting timeline.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
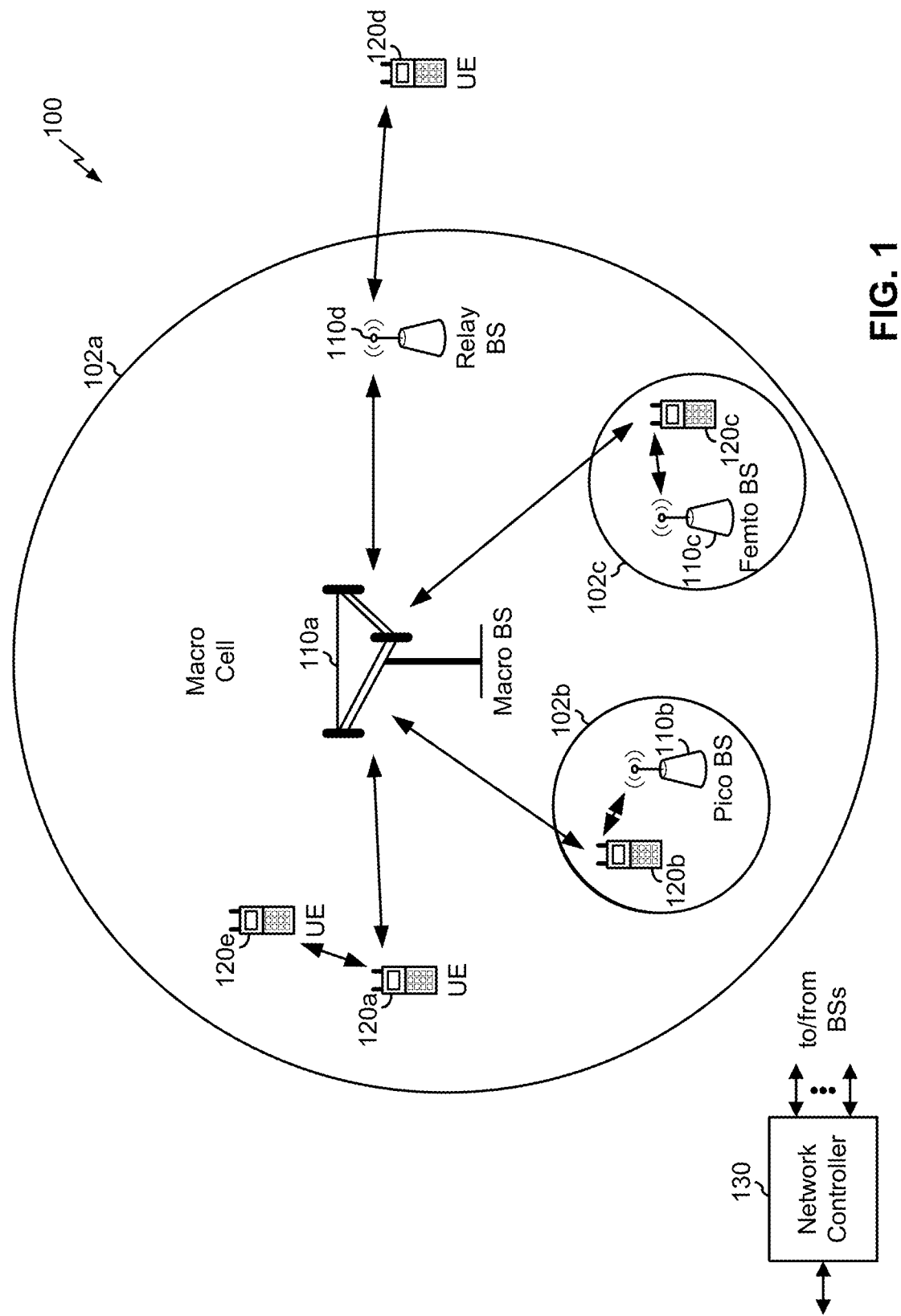
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
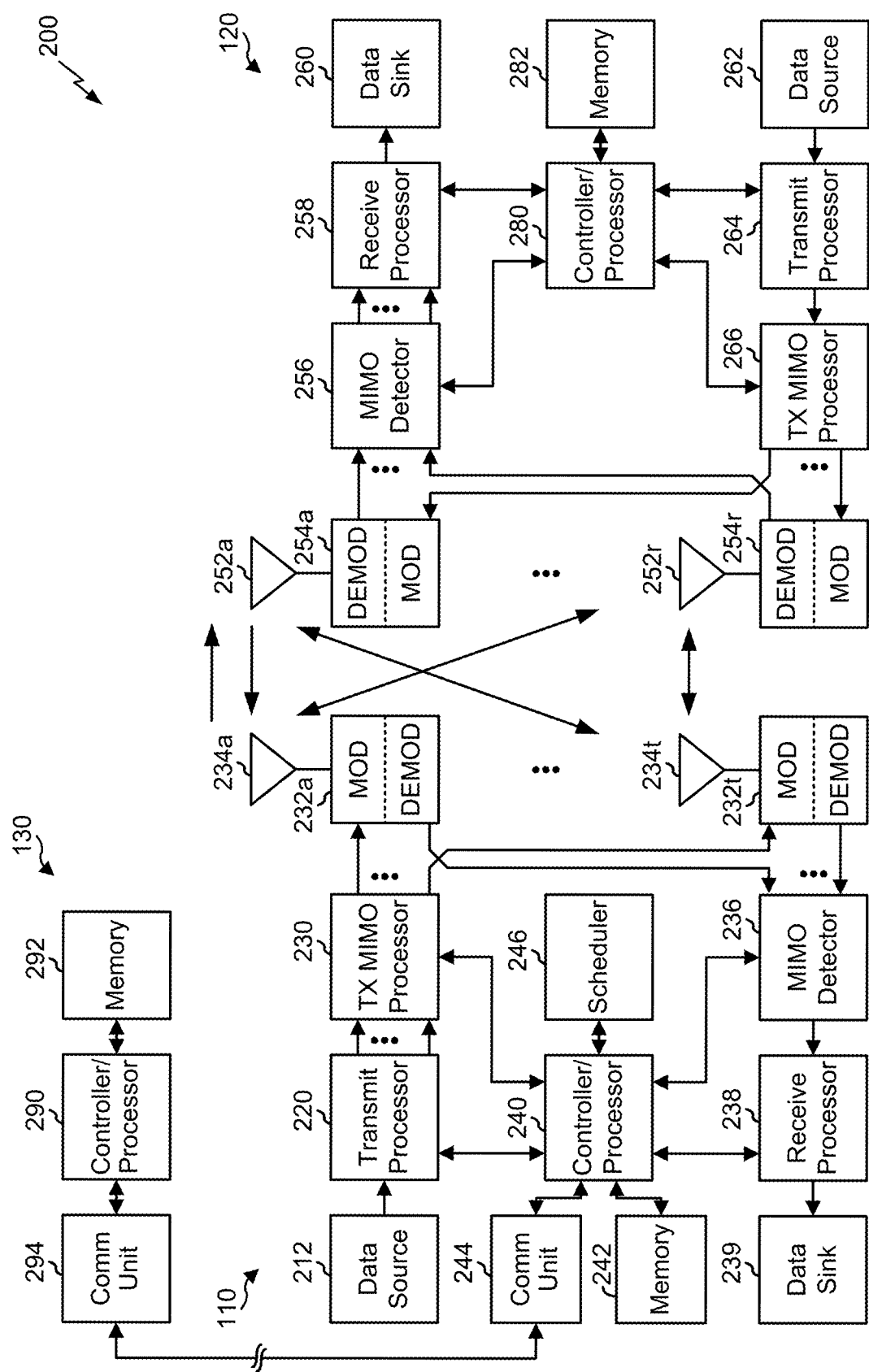
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with CQI reporting for URLLC, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1100 of FIG. 11, process 1200 of FIG.

Figure 13:
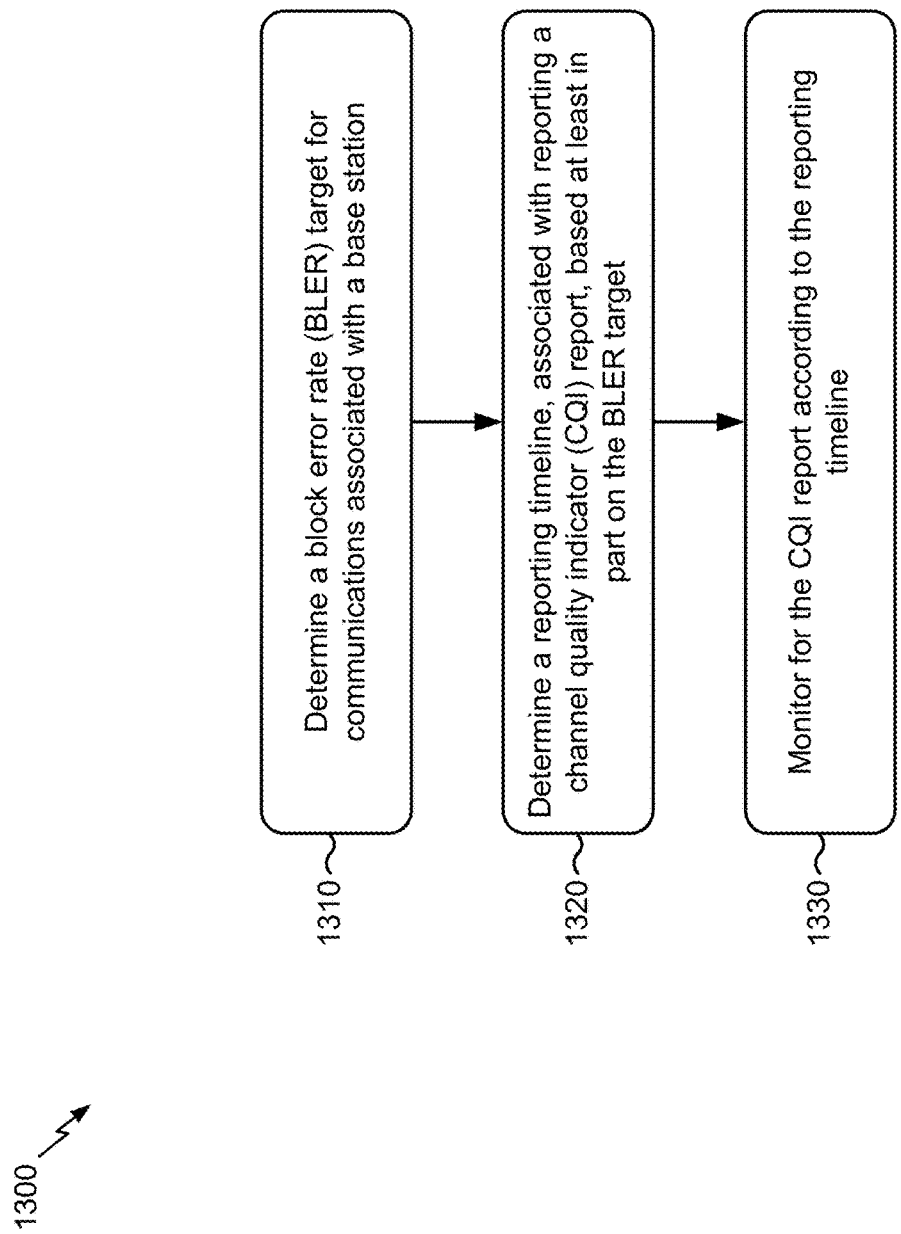

12, process 1300 of FIG. 13, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining a block error rate (BLER) target for communications associated with the UE; means for determining a resource allocation pattern for transmission of channel state information reference signals (CSI-RS) based at least in part on the BLER target; means for monitoring one or more resources, indicated by the resource allocation pattern, for the CSI-RS; and/or the like. Additionally, or alternatively, UE 120 may include means for determining a block error rate (BLER) target for communications associated with the UE; means for determining a number of bits to be used to indicate a channel quality indicator (CQI) index based at least in part on the BLER target; means for transmitting the CQI index using the number of bits; and/or the like. Additionally, or alternatively, UE 120 may include means for determining a block error rate (BLER) target for communications associated with the UE; means for determining a reporting timeline, associated with reporting a channel quality indicator (CQI) report, based at least in part on the BLER target; means for transmitting the CQI report according to the reporting timeline; and/or the like. Additionally, or alternatively, UE 120 may include means for determining a block error rate (BLER) target for communications associated with the UE; means for determining at least one of a number of bits to be used to indicate a channel quality indicator (CQI) index or a reporting timeline associated with reporting the CQI index based at least in part on the BLER target; means for transmitting the CQI index using at least one of the number of bits or the reporting timeline; and/or the like. In some aspects, such means may include one or more components of UE 120 described in connection with FIG. 2, such as antenna 252, DEMOD 254, MIMO detector 256, receive processor 258, controller/processor 280, and/or the like.

In some aspects, base station 110 may include means for determining a block error rate (BLER) target for communications associated with the base station; means for determining at least one of a transmission power or a resource allocation pattern for transmission of channel state information reference signals (CSI-RS) based at least in part on the BLER target; means for transmitting the CSI-RS using at least one of the transmission power or the resource allocation pattern; and/or the like. Additionally, or alternatively, base station 110 may include means for determining a block error rate (BLER) target for communications associated with the base station; means for determining a number of bits to be used to indicate a channel quality indicator (CQI) index based at least in part on the BLER target; means for receiving the CQI index; means for decoding the CQI index based at least in part on the determined number of bits; and/or the like. Additionally, or alternatively, base station 110 may include means for determining a block error rate (BLER) target for communications associated with the base station; means for determining a reporting timeline, associated with reporting a channel quality indicator (CQI) report, based at least in part on the BLER target; means for monitoring for the CQI report according to the reporting timeline; and/or the like. In some aspects, such means may include one or more components of base station 110 described in connection with FIG. 2, such as controller/processor 240, transmit processor 220, TX MIMO processor 230, MOD 232, antenna 234, and/or the like.

As indicated above, FIG. 2 is provided merely as an example. Other examples are possible and may differ from what was described with regard to FIG. 2.

Figure 3A:
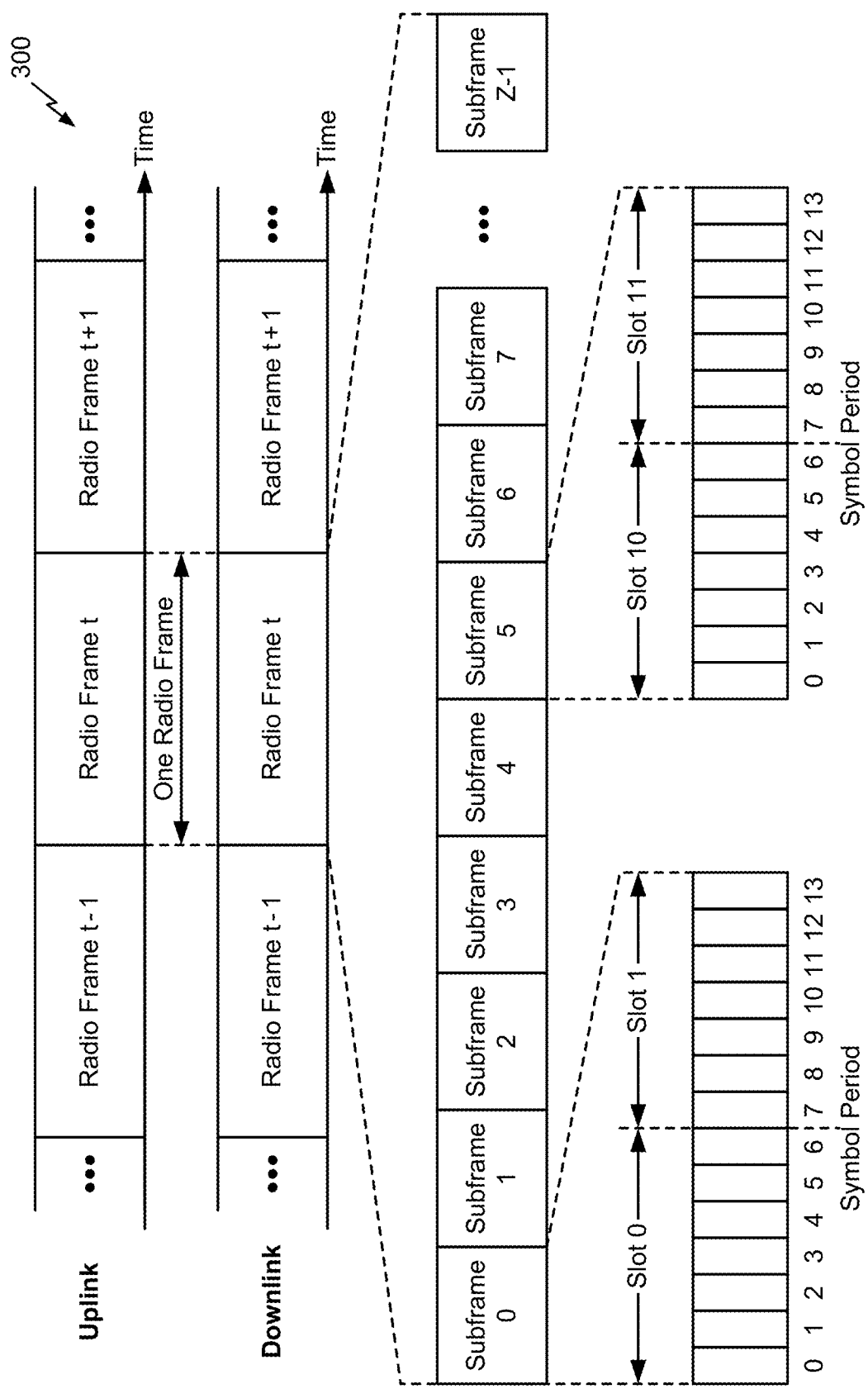
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z ($Z \geq 1$) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
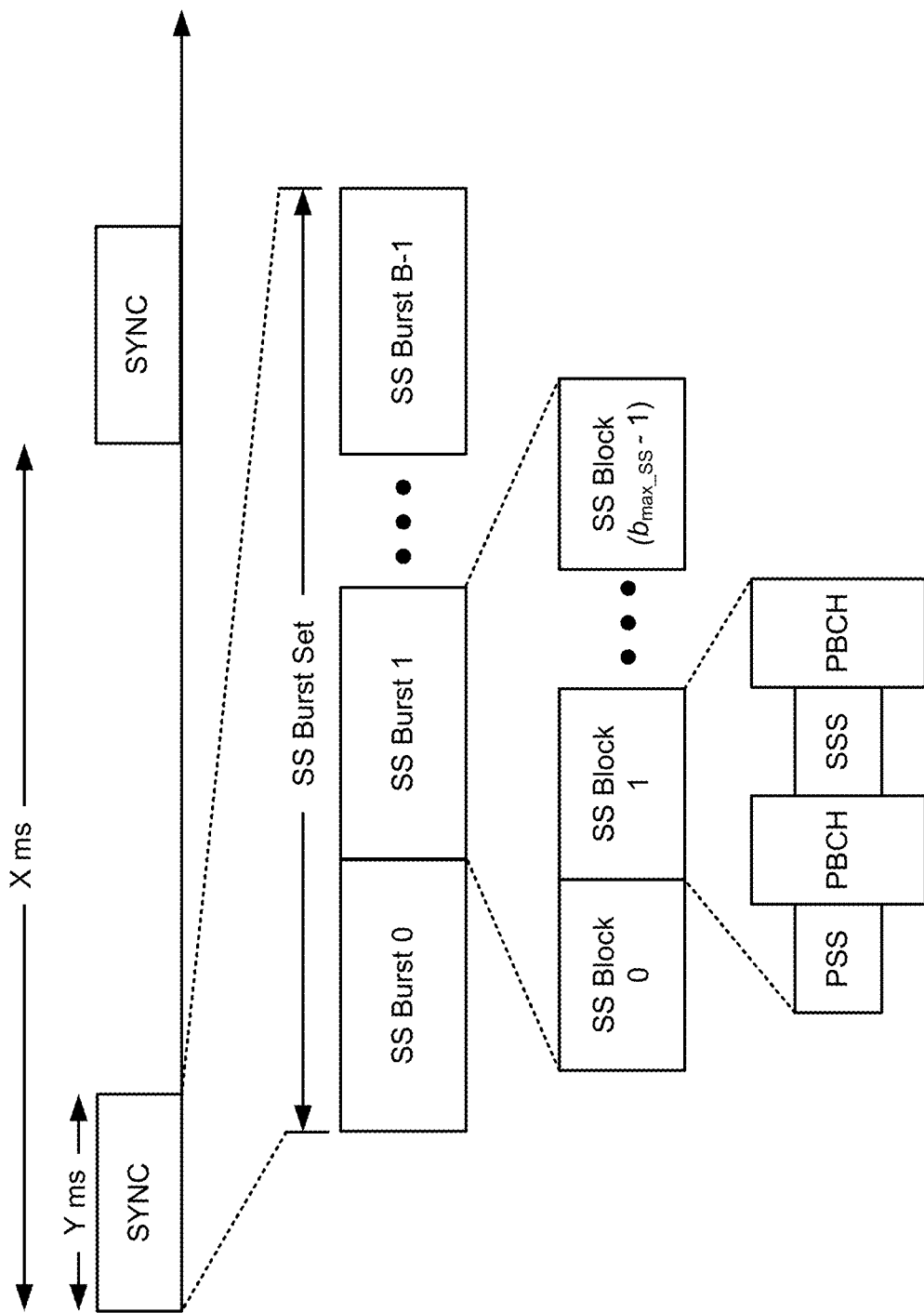
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
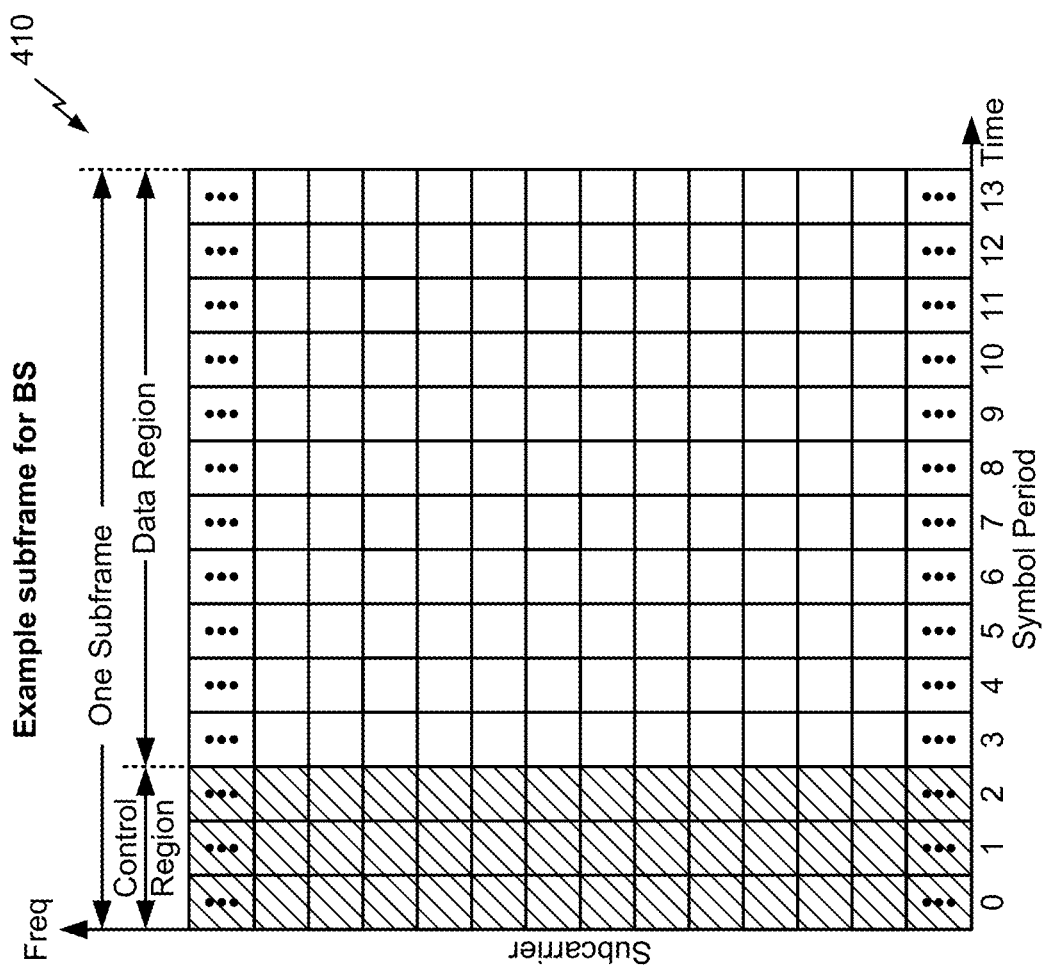
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q E {0, . . . , Q−1}.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

As indicated above, FIG. 4 is provided as an example. Other examples are possible and may differ from what was described with regard to FIG. 4.

Figure 5:
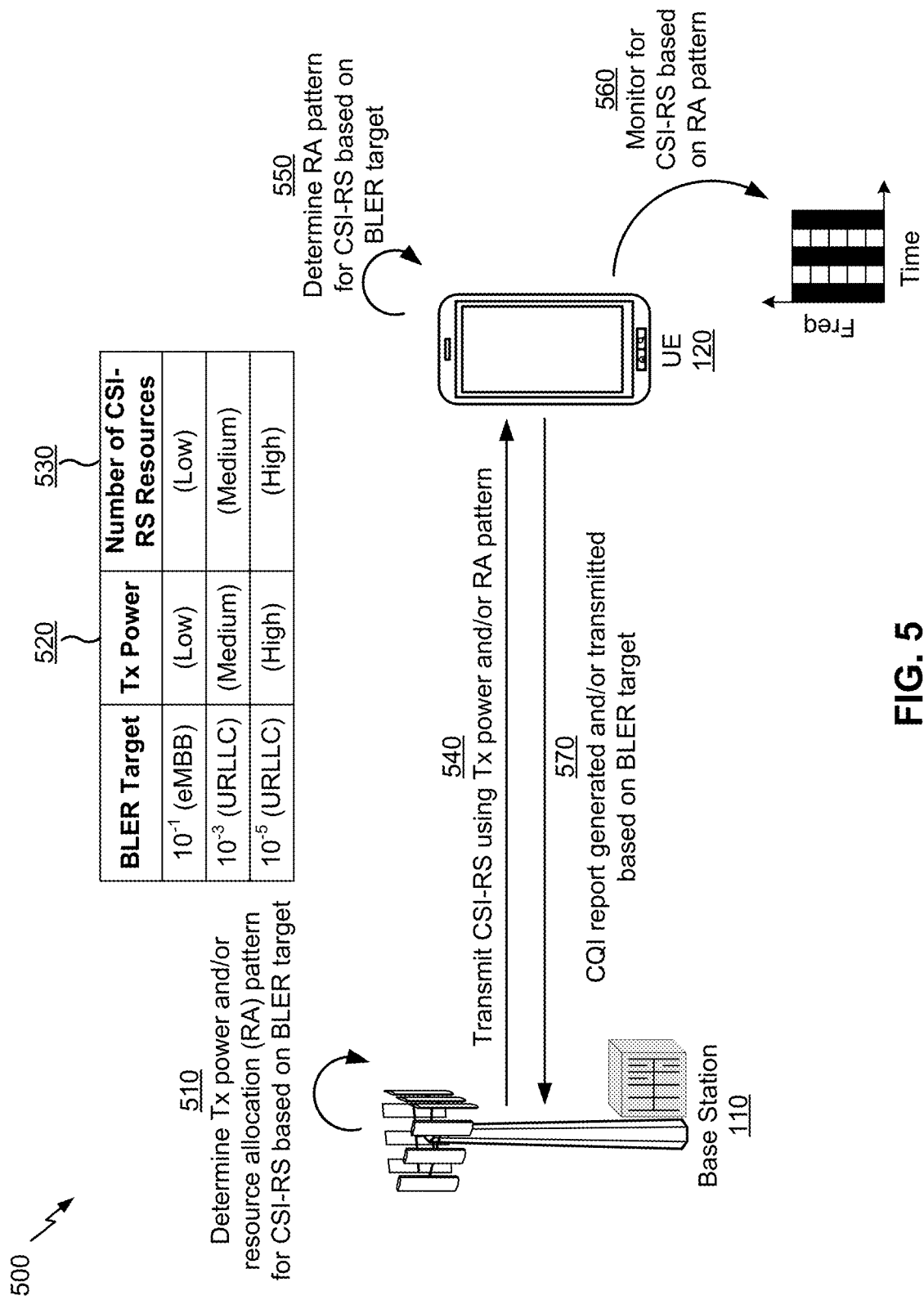
FIGS. 5-7 are diagrams illustrating examples relating to channel quality indicator (CQI) reporting for ultra-reliable low latency communications (URLLC), in accordance with various aspects of the present disclosure.

FIG. 5 is a diagram illustrating an example 500 relating to CQI reporting for URLLC, in accordance with various aspects of the present disclosure.

As shown in FIG. 5, a base station 110 and a UE 120 may communicate with one another using different types of communication services, such as enhanced mobile broadband (eMBB), ultra-reliable low latency communications (URLLC), and/or the like. These different types of communication services may be associated with different service requirements, such as different reliability requirements, different latency requirements, and/or the like. For example, a URLLC service may require higher reliability and/or lower latency than an eMBB service. As a result, the URLLC service may target a lower block error rate (BLER) than the eMBB service to achieve higher reliability and lower latency. Furthermore, the URLLC service may have different service levels with different reliability and/or latency requirements, therefore requiring different BLER targets.

BLER is defined as the ratio of the number of erroneous blocks received to the total number of blocks transmitted. An erroneous block is a transport block (TB) for which the cyclic redundancy check fails at the receiver. As the TB size increases, throughput increases, but the likelihood of a block error occurring also increases. To achieve the appropriate balance between throughput and BLER, the TB size may be selected based at least in part on channel quality, such as by using a larger TB size when channel quality is good, and using a smaller TB size when channel quality is poor. To determine channel quality, the base station 110 may transmit channel state information reference signals (CSI-RS), and the UE 120 may measure the CSI-RS and report a channel quality indicator (CQI) index, representative of channel quality, in a CQI report. The base station 110 may use the CQI index to select a modulation and coding scheme (MCS) and/or a coding rate for a downlink communication, which may dictate a TB size of the downlink communication. For example, the base station 110 may use a larger TB size when the UE 120 reports a higher CQI index (e.g., indicating better channel quality), and may use a smaller TB size when the UE 120 reports a lower CQI index (e.g., indicating poorer channel quality).

To determine a CQI index to be reported, the UE 120 may use a CQI table, and may report, in a CQI report, the maximum CQI index in the table for which a target BLER can be achieved. However, with multiple possible BLER requirements for different types of services, such as URLLC and eMBB, various factors may need to be considered to provide a reliable and timely CQI report with low overhead. Some techniques and apparatuses described herein assist with providing a CQI report that is highly reliable (e.g., as described in more detail in connection with FIG. 5), with low overhead (e.g., as described in more detail in connection with FIG. 6), and that is reported according to an appropriate reporting timeline (e.g., as described in more detail in connection with FIG. 7).

As shown in FIG. 5, and by reference number 510, the base station 110 may determine a BLER target for communications associated with the base station 110 (e.g., for communications between the base station 110 and the UE 120), and may determine at least one of a transmission power or a resource allocation pattern, for transmission of CSI-RS, based at least in part on the BLER target. As used herein, "determining" may mean determining autonomously without being instructed by another device or determining based at least in part on an instruction received from another device. For example, a UE 120 may "determine" autonomously without being instructed by a base station 110, or may "determine" based at least in part on an instruction received from the base station 110. In some aspects, the base station 110 may determine the BLER target based at least in part on a communication service with the UE 120, which may be negotiated and/or configured during a radio resource control (RRC) configuration procedure. In some aspects, the BLER target may be correspond to a CQI table that maps to the BLER target. For example, different CQI tables (e.g., having different entries) may map to different BLER targets. Thus, the base station 110 may indicate a BLER target to the UE 120 by explicitly indicating the BLER target or by implicitly indicating the BLER target by indicating a CQI table that maps to the BLER target.

As an example, an eMBB service may be associated with a BLER target of $10^{-1}$ (e.g., 10% or fewer erroneous blocks). In some aspects, a URLLC service may be associated with two BLER targets, such as a high BLER target (e.g., $10^{-3}$, with 0.1% or fewer erroneous blocks) and a low BLER target (e.g., $10^{-5}$, with 0.001% or fewer erroneous blocks). These URLLC BLER targets (e.g., $10^{-3}$ and $10^{-5}$) are provided as examples, and other examples are possible.

As shown by reference number 520, the base station 110 may determine that the CSI-RS are to be transmitted with a higher transmission power when the BLER target is lower. Conversely, the base station 110 may determine that the CSI-RS are to be transmitted with a lower transmission power when the BLER target is higher. For example, the CSI-RS may be transmitted with a lower transmission power for eMBB communications associated with a higher BLER target (e.g., shown as $10^{-1}$), and may be transmitted with a higher transmission power for URLLC communications associated with a lower BLER target (e.g., shown as $10^{-3}$ and $10^{-5}$). Similarly, the CSI-RS may be transmitted with a lower transmission power for high BLER target URLLC communications (e.g., shown as $10^{-3}$), and may be transmitted with a higher transmission power for low BLER target URLLC communications (e.g., shown as $10^{-5}$).

As shown by reference number 530, the base station 110 may determine that a larger number of CSI-RS are to be transmitted (e.g., using more CSI-RS resources) when the BLER target is lower. Conversely, the base station 110 may determine that a smaller number of CSI-RS are to be transmitted (e.g., using fewer CSI-RS resources) when the BLER target is higher. For example, fewer CSI-RS may be transmitted for eMBB communications associated with a higher BLER target (e.g., shown as $10^{-1}$), and more CSI-RS may be transmitted for URLLC communications associated with a lower BLER target (e.g., shown as $10^{-3}$ and $10^{-5}$). Similarly, fewer CSI-RS may be transmitted for high BLER target URLLC communications (e.g., shown as $10^{-3}$), and more CSI-RS may be transmitted for low BLER target URLLC communications (e.g., shown as $10^{-5}$).

In some aspects, the number of CSI-RS to be transmitted may be indicated by a resource allocation pattern, which may indicate time resources to be used for CSI-RS transmission, frequency resources to be used for CSI-RS transmission, resource blocks to be used for CSI-RS transmission, and/or the like. In some aspects, the resource allocation pattern may be recurring (e.g., may recur over time, over a set of frequencies, and/or the like). In some aspects, the resource allocation pattern may not recur (e.g., may occur a single time). For example, CSI-RS may be transmitted more frequently (e.g., using more time resources within a time window) for lower BLER targets, and may be transmitted less frequently (e.g., using fewer time resources within the time window) for higher BLER targets. In this case, if the CSI-RS is transmitted periodically, the period may be shorter for lower BLER targets, and may be longer for higher BLER targets. Additionally, or alternatively, CSI-RS may be transmitted on more frequencies (e.g., using more frequency resources within a window) for lower BLER targets, and may be transmitted on fewer frequencies (e.g., using fewer frequency resources within the window) for higher BLER targets.

As the BLER target decreases, the accuracy of the CQI index reported by the UE 120 may become increasingly important to ensure that the base station 110 selects an appropriate MCS, coding rate, and/or TB size for the channel conditions. When the base station 110 transmits CSI-RS using a higher transmission power (e.g., using power boosting), the UE 120 may have an increased likelihood of receiving the CSI-RS (e.g., at the cost of additional base station resources being used for transmission). Similarly, when the base station 110 transmits more CSI-RS resources (e.g., on more time and/or frequency resources), the UE 120 may have an increased likelihood of receiving the CSI-RS, and/or may use a larger number of CSI-RS to perform channel estimation (e.g., at the cost of additional network resources being used for CSI-RS, more base station resources being used to transmit CSI-RS, and more UE resources being used to receive CSI-RS). As a result, the UE 120 may obtain a better channel estimate, and may report a CQI index that more accurately represents channel quality. By adjusting the transmission power of CSI-RS and/or the number of transmitted CSI-RS based at least in part on the BLER target, the base station 110 may achieve an appropriate balance between resource consumption and accurate channel estimation.

As shown in FIG. 5, in some aspects, the base station 110 may use a table, stored in memory of the base station 110, to determine the resource allocation pattern and/or the transmission power. For example, the table may indicate a mapping between different BLER targets and corresponding transmission powers and/or corresponding resource allocation patterns.

In some aspects, the base station 110 may determine a first resource allocation pattern for CSI-RS (e.g., using the table), and may determine that there are insufficient resources (e.g., time and/or frequency resources) to schedule the CSI-RS using the first resource allocation pattern. In this case, the base station 110 may use a second resource allocation pattern (e.g., a fallback resource allocation pattern, a default resource allocation pattern, a second resource allocation pattern indicated in the table, and/or the like) that indicates fewer resources than the first resource allocation pattern. In some aspects, the base station 110 may indicate, to the UE 120, that the second resource allocation pattern is being used. In some aspects, the base station 110 may transmit the CSI-RS using the second resource allocation pattern and using the transmission power indicated in the table (e.g., using power boosting). In some aspects, the base station 110 may not power boost the CSI-RS transmissions if the CSI-RS can be scheduled according to the first resource allocation pattern. Thus, the base station 110 may use a resource allocation pattern to improve the accuracy of a reported CQI index, and may use power boosting to improve the accuracy of the reported CQI index if the resource allocation pattern cannot be used. In some aspects, the base station 110 may use both the resource allocation pattern and power boosting to improve the accuracy of the reported CQI index.

As shown by reference number 540, the base station 110 may transmit the CSI-RS using at least one of the transmission power or the resource allocation pattern. For example, the base station 110 may transmit the CSI-RS using the determined transmission power. Additionally, or alternatively, the base station 110 may transmit the CSI-RS on one or more resources indicated in the resource allocation pattern (e.g., time resources, frequency resources, resource blocks, resource elements, and/or the like). In some aspects, the CSI-RS may be a non-zero power (NZP) CSI-RS. Additionally, or alternatively, the CSI-RS may be an interference measurement resource (IMR).

As shown by reference number 550, the UE 120 may determine a BLER target for communications associated with the UE 120 (e.g., for communications between the base station 110 and the UE 120), and may determine a resource allocation pattern for CSI-RS based at least in part on the BLER target. In some aspects, the UE 120 may determine the BLER target based at least in part on a communication service being used by the UE 120, which may be negotiated and/or configured during an RRC configuration procedure. The communication service may include an eMBB service, a URLLC service, and/or the like, as described above. In some aspects, different communication services may be associated with different BLER targets, and/or a communication service (e.g., URLLC) may be associated with multiple BLER targets, as described above. In some aspects, the BLER target may be indicated during an RRC configuration procedure (e.g., via an explicit indication of the BLER target or an indication of a CQI table that maps to the BLER target). Additionally, or alternatively, the resource allocation pattern may be indicated during an RRC configuration procedure.

As shown by reference number 560, the UE 120 may monitor for the CSI-RS based at least in part on the determined resource allocation pattern. For example, the UE 120 may monitor one or more resources, indicated by the resource allocation pattern, for the CSI-RS. As described above, the resource allocation pattern may indicate time resources to be used for CSI-RS, frequency resources to be used for CSI-RS, resource blocks to be used for CSI-RS, and/or the like.

The UE 120 may determine the resource allocation pattern in a similar manner as described above in connection with the base station 110. For example, the UE 120 may determine that a larger number of resources are to be monitored for CSI-RS when the BLER target is lower. Conversely, the UE 120 may determine that a smaller number of resources are to be monitored for CSI-RS when the BLER target is higher. In some aspects, the UE 120 may monitor for CSI-RS more frequently (e.g., using more time resources within a time window) for lower BLER targets, and may monitor for CSI-RS less frequently (e.g., using fewer time resources within the time window) for higher BLER targets. Additionally, or alternatively, the UE 120 may monitor for CSI-RS on more frequencies (e.g., using more frequency resources within a window) for lower BLER targets, and may monitor for CSI-RS on fewer frequencies (e.g., using fewer frequency resources within the window) for higher BLER targets.

In some aspects, the UE 120 may use a table, stored in memory of the UE 120, to determine the resource allocation pattern for CSI-RS. For example, the table may indicate a mapping between different BLER targets and corresponding resource allocation patterns.

As shown by reference number 570, the UE 120 may generate the CQI report based at least in part on the BLER target, and/or may transmit the CQI report based at least in part on the BLER target. For example, the UE 120 may monitor for CSI-RS based at least in part on the resource allocation pattern determined based at least in part on the BLER target, may perform a channel estimation using the CSI-RS, and may report the channel estimation (e.g., indicative of channel quality) in the CQI report.

In some aspects, the UE 120 may indicate channel quality using a CQI index in the CQI report, and may determine a number of bits to be used for the CQI index based at least in part on the BLER target, as described in more detail below in connection with FIG. 6. Additionally, or alternatively, the UE 120 may determine a reporting timeline, associated with reporting the CQI report, based at least in part on the BLER target, and may transmit the CQI report according to the reporting timeline, as described in more detail below in connection with FIG. 7. Similarly, the base station 110 may monitor for the CQI report according to the reporting timeline, and/or may decode the CQI index based at least in part on the number of bits, either or both of which may be determined based at least in part on the BLER target.

As the BLER target decreases, the accuracy of the CQI index reported by the UE 120 may become increasingly important to ensure that the base station 110 selects an appropriate MCS, coding rate, and/or TB size for the channel conditions. When the UE 120 receives more CSI-RS, the UE 120 may use a larger number of CSI-RS to perform channel estimation (e.g., at the cost of additional network resources being used for CSI-RS, more base station resources being used to transmit CSI-RS, and more UE resources being used to receive CSI-RS). As a result, the UE 120 may obtain a better channel estimate, and may report a CQI index that more accurately represents channel quality. By adjusting the number of CSI-RS based at least in part on the BLER target, the base station 110 and the UE 120 may achieve an appropriate balance between resource consumption and accurate channel estimation.

As indicated above, FIG. 5 is provided as an example. Other examples are possible and may differ from what was described with respect to FIG. 5.

Figure 6:
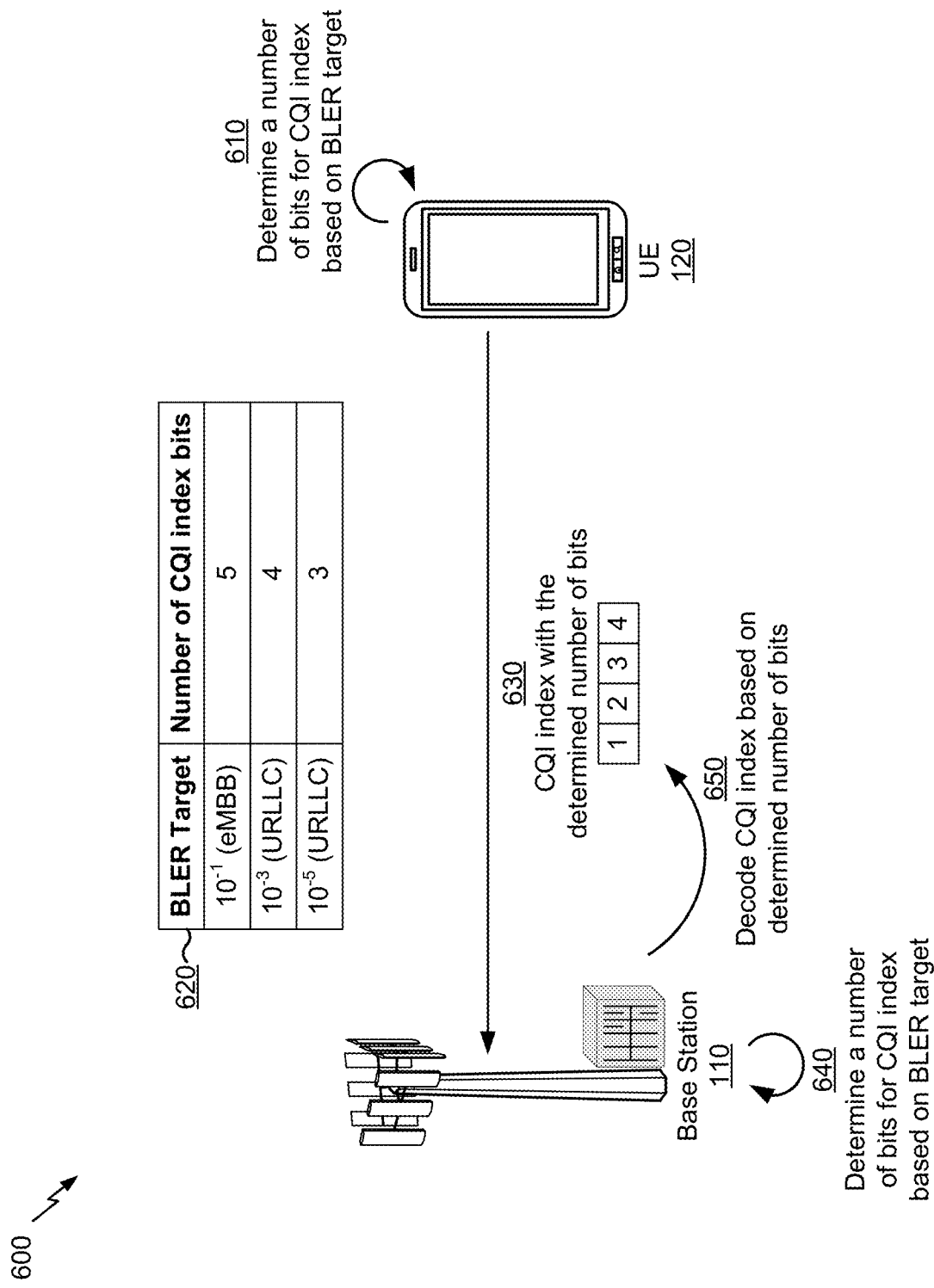

FIG. 6 is a diagram illustrating another example 600 relating to CQI reporting for URLLC, in accordance with various aspects of the present disclosure.

As shown in FIG. 6, a base station 110 and a UE 120 may communicate with one another using different types of communication services, such as eMBB, URLLC, and/or the like. As described above in connection with FIG. 5, different types of communication services may be associated with different BLER targets, and/or a particular type of communication service (e.g., URLLC) may be associated with multiple BLER targets for different scenarios or deployments. In some cases, a low BLER target (e.g., $10^{-3}$, $10^{-5}$, and/or the like) may be achieved only if an initial transmission is received without an error, and may not be achieved if the initial transmission needs to be retransmitted. In some aspects, the BLER target may be correspond to a CQI table that maps to the BLER target. For example, different CQI tables (e.g., having different entries) may map to different BLER targets. Thus, the base station 110 may indicate a BLER target to the UE 120 by explicitly indicating the BLER target or by implicitly indicating the BLER target by indicating a CQI table that maps to the BLER target.

To increase the likelihood of the initial transmission being received without an error, the base station 110 and the UE 120 may communicate using a relatively low spectral efficiency (e.g., a smaller TB size, a lower coding rate, a lower data rate, a lower MCS index, and/or the like). As a result, some higher CQI indices that may be reported for higher BLER targets (e.g., $10^{-1}$ for eMBB) may rarely, if ever, be used for lower BLER targets. Thus, for lower BLER targets, the UE 120 may use fewer bits to report a CQI index because the CQI index may be selected from fewer possible CQI indices as compared to higher BLER targets. In this way, the UE 120 may reduce CQI overhead, which may conserve network resources, reduce processing time, reduce latency, and/or improve performance. Additional details are described below.

As shown in FIG. 6, and by reference number 610, the UE 120 may determine a BLER target for communications associated with the UE 120 (e.g., for communications between the base station 110 and the UE 120), and may determine a number of bits to be used to indicate a CQI index based at least in part on the BLER target. In some aspects, the UE 120 may determine the BLER target based at least in part on a communication service being used by the UE 120 (e.g., eMBB, URLLC, and/or the like), which may be indicated in an RRC message. Additionally, or alternatively, the BLER target may be indicated in an RRC message (e.g., via an explicit indication of the BLER target in the RRC message or an indication of a CQI table, in the RRC message, that maps to the BLER target).

As shown by reference number 620, the UE 120 may determine that a larger number of bits are to be used for the CQI index when the BLER target is higher. Conversely, the UE 120 may determine that a smaller number of bits are to be used for the CQI index when the BLER target is lower. In some aspects, the smaller number of bits may include less than five bits. For example, the number of bits for a BLER target of $10^{-1}$ may be five bits, and the number of bits for a BLER target of less than $10^{-1}$ may be less than five bits. As another example, the number of bits for a BLER target of less than $10^{-1}$ may be four bits, three bits, and/or the like, as shown. These numbers of bits are provided as examples, and other examples are possible. In some aspects, the UE 120 may use a table, stored in memory of the UE 120, to determine the number of bits to be used for the CQI index. For example, the table may indicate a mapping between different BLER targets and corresponding numbers of bits for the CQI index.

As shown by reference number 630, the UE 120 may transmit, and the base station 110 may receive, the CQI index using the determined number of bits. For example, the UE 120 may indicate the CQI index, in a CQI report, using the determined number of bits (e.g., three bits, four bits, five bits, and/or the like) for the CQI index. In some aspects, the UE 120 may determine the CQI index based at least in part on one or more CSI-RS transmitted by the base station 110, which may be transmitted and/or monitored for according to a resource allocation pattern, which may be determined based at least in part on the BLER target, as described above in connection with FIG. 5. Additionally, or alternatively, the UE 120 may transmit, and the base station 110 may monitor for, the CQI report according to a reporting timeline determined based at least in part on the BLER target, as described below in connection with FIG. 7.

As shown by reference number 640, the base station 110 may determine a BLER target for communications associated with the base station 110 (e.g., for communications between the base station 110 and the UE 120), and may determine a number of bits to be used to indicate a CQI index based at least in part on the BLER target. As described above, the BLER target may be determined during an RRC configuration procedure.

As described above, the number of bits may be larger (e.g., five bits and/or the like) for a higher BLER target, and may be smaller (e.g., less than five bits) for a lower BLER target. In some aspects, the base station 110 may use a table, stored in memory of the base station 110, to determine the number of bits to be used for the CQI index, in a similar manner as described above.

As shown by reference number 650, the base station 110 may decode the received CQI index based at least in part on the determined number of bits. For example, the base station 110 may decode a received CQI report using an assumption that the CQI index, included in the CQI report, includes the determined number of bits.

By using fewer bits to indicate a CQI index when the BLER target is low, the UE 120 may reduce CQI overhead, conserve network resources, reduce processing time, reduce latency, and/or improve performance. The reduced number of bits may not sacrifice CQI reporting capability because some CQI indices that may be reported for higher BLER targets (e.g., $10^{-1}$ for eMBB) may rarely, if ever, be used for lower BLER targets.

As indicated above, FIG. 6 is provided as an example. Other examples are possible and may differ from what was described with respect to FIG. 6.

Figure 7:
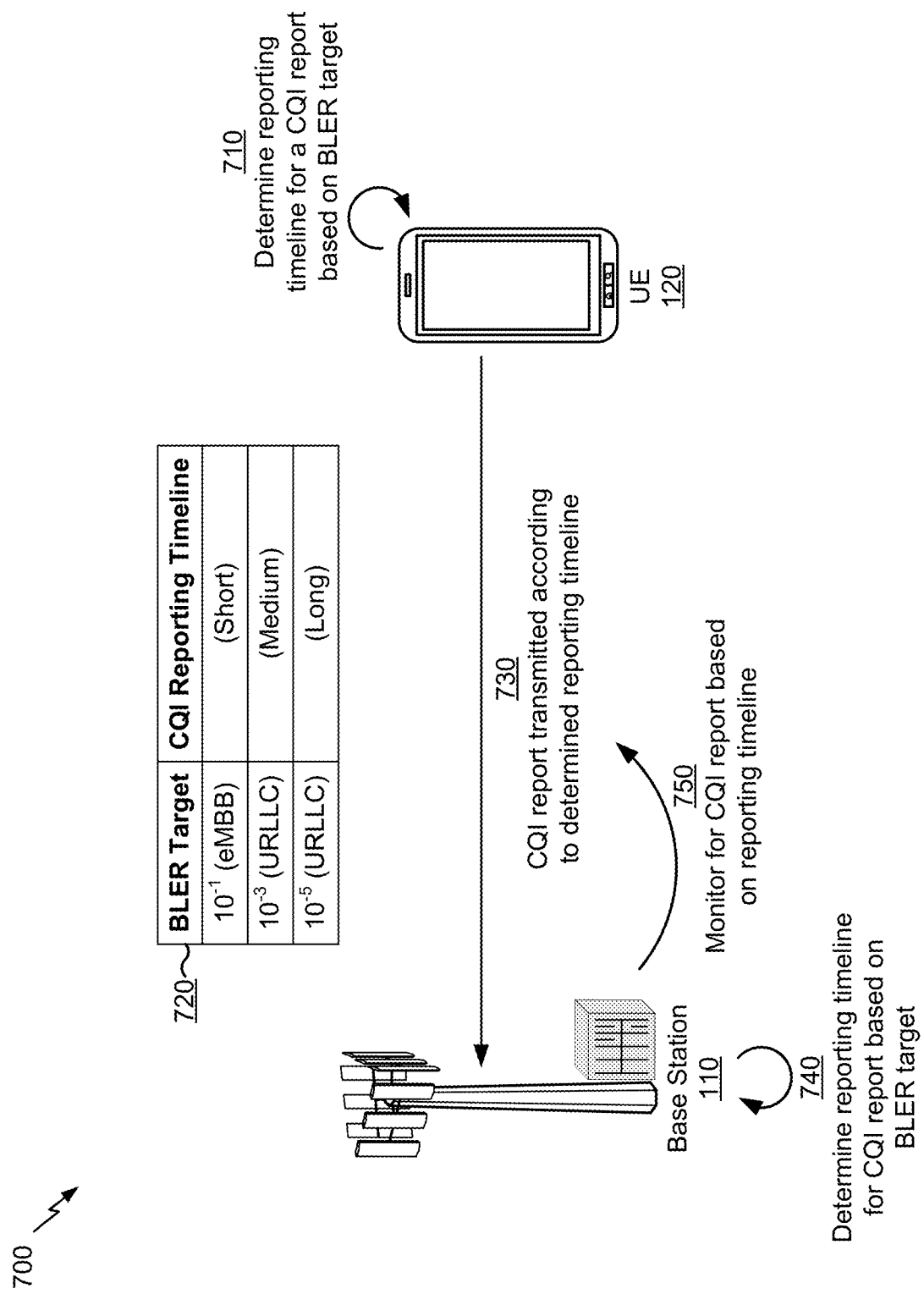

FIG. 7 is a diagram illustrating another example 700 relating to CQI reporting for URLLC, in accordance with various aspects of the present disclosure.

As shown in FIG. 7, a base station 110 and a UE 120 may communicate with one another using different types of communication services, such as eMBB, URLLC, and/or the like. As described above in connection with FIG. 5, different types of communication services may be associated with different BLER targets, and/or a particular type of communication service (e.g., URLLC) may be associated with multiple BLER targets for different scenarios or deployments. In some aspects, the BLER target may correspond to a CQI table that maps to the BLER target. For example, different CQI tables (e.g., having different entries) may map to different BLER targets.

In some cases, an inaccurate CQI index may have a larger impact on the likelihood of achieving a low BLER target as compared to a high BLER target (e.g., because a high BLER target leaves more room for error). Because of this, the UE 120 and the base station 110 may benefit from more accurate CQI index reporting for lower BLER targets. To achieve a more accurate CQI index, the UE 120 may measure a larger number of CSI-RS to be used to determine the CQI index. For example, a resource allocation pattern for CSI-RS may indicate that more resources are to be used for CSI-RS when the BLER target is lower, as described above in connection with FIG. 5. In some aspects, the UE 120 may require more time to measure a larger number of CSI-RS and/or to determine the CQI index from a larger number of CSI-RS for a lower BLER target. To allow for this increased time for CQI index determination, the UE 120 may use a longer reporting timeline for a CQI report associated with a lower BLER target, as described in more detail below.

As shown in FIG. 7, and by reference number 710, the UE 120 may determine a BLER target for communications associated with the UE 120 (e.g., for communications between the base station 110 and the UE 120), and may determine a reporting timeline, associated with reporting a CQI report, based at least in part on the BLER target. In some aspects, the UE 120 may determine the BLER target based at least in part on a communication service being used by the UE 120 and/or information included in an RRC message, as described elsewhere herein.

As shown by reference number 720, the UE 120 may determine that a longer reporting timeline is to be used when the BLER target is lower. Conversely, the UE 120 may determine that a shorter reporting timeline is to be used when the BLER target is higher. In some aspects, the reporting timeline may represent a period between transmission of successive (e.g., consecutive) CQI reports (e.g., for reporting periodic CQI). In this case, the period may be longer for a lower BLER target, and/or may be shorter for a higher BLER target. In some aspects, the reporting timeline may represent a time between occurrence of an event that triggers CQI reporting (e.g., a request from the base station 110 for reporting of aperiodic CQI) and transmission of the CQI report triggered by the event. In this case, the time may be longer for a lower BLER target, and/or may be shorter for a higher BLER target. In some aspects, the UE 120 may use a table, stored in memory of the UE 120, to determine the reporting timeline. For example, the table may indicate a mapping between different BLER targets and corresponding reporting timelines.

As shown by reference number 730, the UE 120 may transmit, and the base station 110 may receive, the CQI report according to the determined reporting timeline. As described elsewhere herein, the UE 120 may indicate a CQI index in the CQI report. In some aspects, the UE 120 may determine the CQI index based at least in part on one or more CSI-RS transmitted by the base station 110, which may be transmitted and/or monitored for according to a resource allocation pattern, which may be determined based at least in part on the BLER target, as described above in connection with FIG. 5. Additionally, or alternatively, the UE 120 may indicate the CQI index using a number of bits determined based at least in part on the BLER target, as described above in connection with FIG. 6.

As shown by reference number 740, the base station 110 may determine a BLER target for communications associated with the base station 110 (e.g., for communications between the base station 110 and the UE 120), and may determine a reporting timeline for a CQI report based at least in part on the BLER target. As described above, the BLER target may be determined during an RRC configuration procedure. As also described above, the reporting timeline may be shorter for a higher BLER target, and may be longer for a lower BLER target. In some aspects, the base station 110 may use a table, stored in memory of the base station 110, to determine the reporting timeline, in a similar manner as described above.

As shown by reference number 750, the base station 110 may monitor for the CQI report according to the determined reporting timeline. For example, the base station 110 may monitor a particular transmission time interval (TTI) (e.g., a slot, a subframe, and/or the like) for the CQI report based at least in part on the determined reporting timeline. In this way, the base station 110 and the UE 120 may permit more time for CQI index determination for a lower BLER target, which may improve the accuracy of the CQI index.

As indicated above, FIG. 7 is provided as an example. Other examples are possible and may differ from what was described with respect to FIG. 7.

Figure 8:
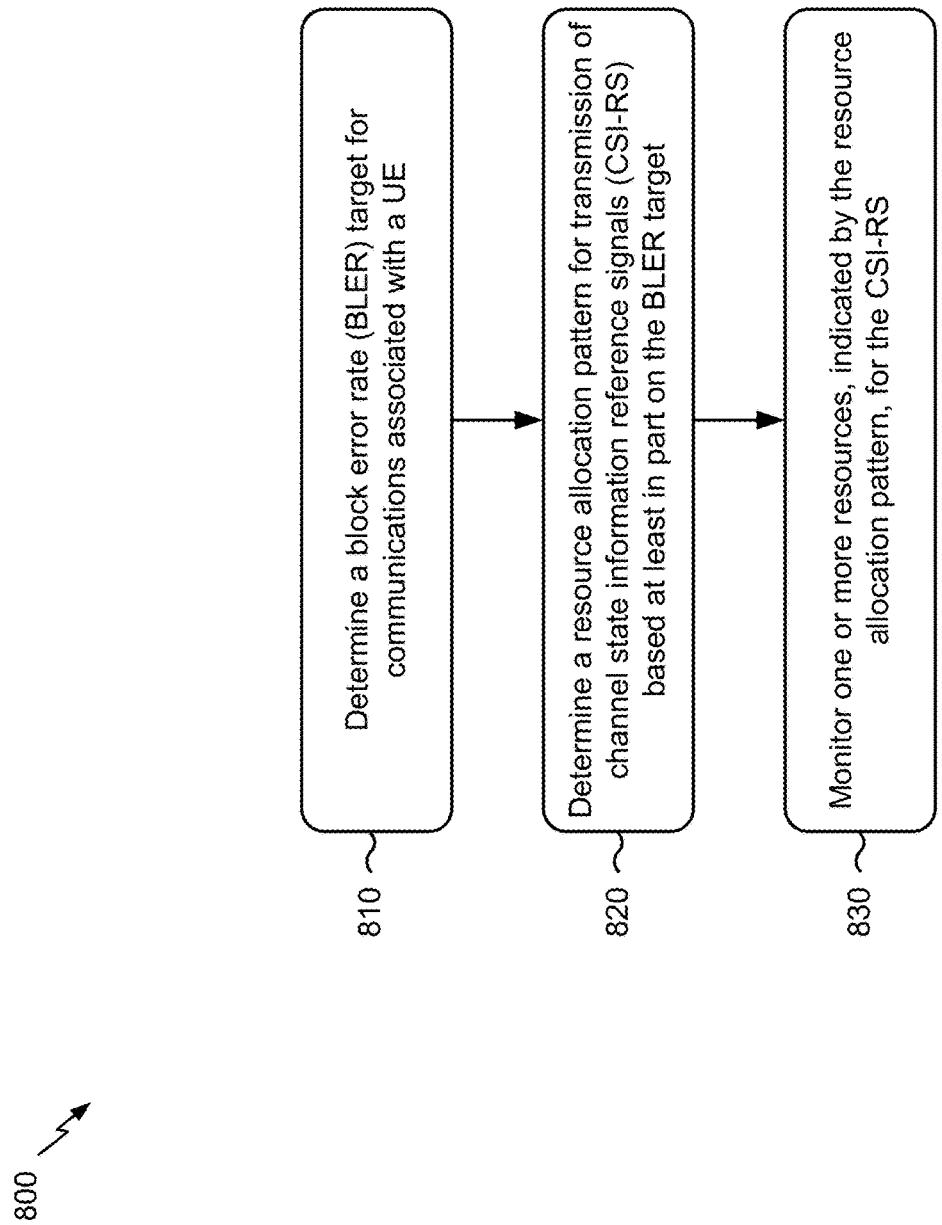
FIGS. 8-13 are diagrams illustrating example processes relating to CQI reporting for URLLC, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120 and/or the like) performs operations relating to CQI reporting for URLLC.

As shown in FIG. 8, in some aspects, process 800 may include determining a block error rate (BLER) target for communications associated with the UE (block 810). For example, the UE (e.g., using controller/processor 280 and/or the like) may determine a BLER target for communications associated with the UE, as described above in connection with FIGS. 5-7.

As further shown in FIG. 8, in some aspects, process 800 may include determining a resource allocation pattern for transmission of channel state information reference signals (CSI-RS) based at least in part on the BLER target (block 820). For example, the UE (e.g., using controller/processor 280 and/or the like) may determine a resource allocation pattern for transmission of CSI-RS based at least in part on the BLER target, as described above in connection with FIGS. 5-7.

As further shown in FIG. 8, in some aspects, process 800 may include monitoring one or more resources, indicated by the resource allocation pattern, for the CSI-RS (block 830). For example, the UE (e.g., using antenna 252, DEMOD 254, MIMO detector 256, receive processor 258, controller/processor 280, and/or the like) may monitor one or more resources, indicated by the resource allocation pattern, for the CSI-RS, as described above in connection with FIGS. 5-7.

Process 800 may include additional aspects, such as any single aspect or any combination of aspects described below and/or in connection with one or more other processes described elsewhere herein.

In a first aspect, the resource allocation pattern indicates more resources for the CSI-RS when the BLER target is lower, or the resource allocation pattern indicates fewer resources for the CSI-RS when the BLER target is higher. In a second aspect alone or in combination with the first aspect, the resource allocation pattern indicates that the CSI-RS are to be transmitted more frequently when the BLER target is lower, or the resource allocation pattern indicates that the CSI-RS are to be transmitted less frequently when the BLER target is higher. In a third aspect alone or in combination with any of the first through second aspects, the resource allocation pattern indicates that the CSI-RS are to be transmitted on a larger number of frequencies when the BLER target is lower, or the resource allocation pattern indicates that the CSI-RS are to be transmitted on a smaller number of frequencies when the BLER target is higher.

In a fourth aspect alone or in combination with any of the first through third aspects, the CSI-RS includes at least one of: a non-zero power (NZP) CSI-RS, an interference measurement resource (IMR), or some combination thereof. In a fifth aspect alone or in combination with any of the first through fourth aspects, the resource allocation pattern is determined based at least in part on a table, stored in memory of the UE, that indicates a mapping between a plurality of BLER targets and a corresponding plurality of resource allocation patterns.

In a sixth aspect alone or in combination with any of the first through fifth aspects, the UE may determine a number of bits to be used to indicate a CQI index based at least in part on the BLER target; and may transmit the CQI index using the number of bits, wherein the CQI index is determined based at least in part on the CSI-RS. In a seventh aspect alone or in combination with any of the first through sixth aspects, the UE may determine a reporting timeline, associated with reporting a CQI report, based at least in part on the BLER target; and may transmit the CQI report according to the reporting timeline, wherein the CQI report is generated based at least in part on the CSI-RS.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
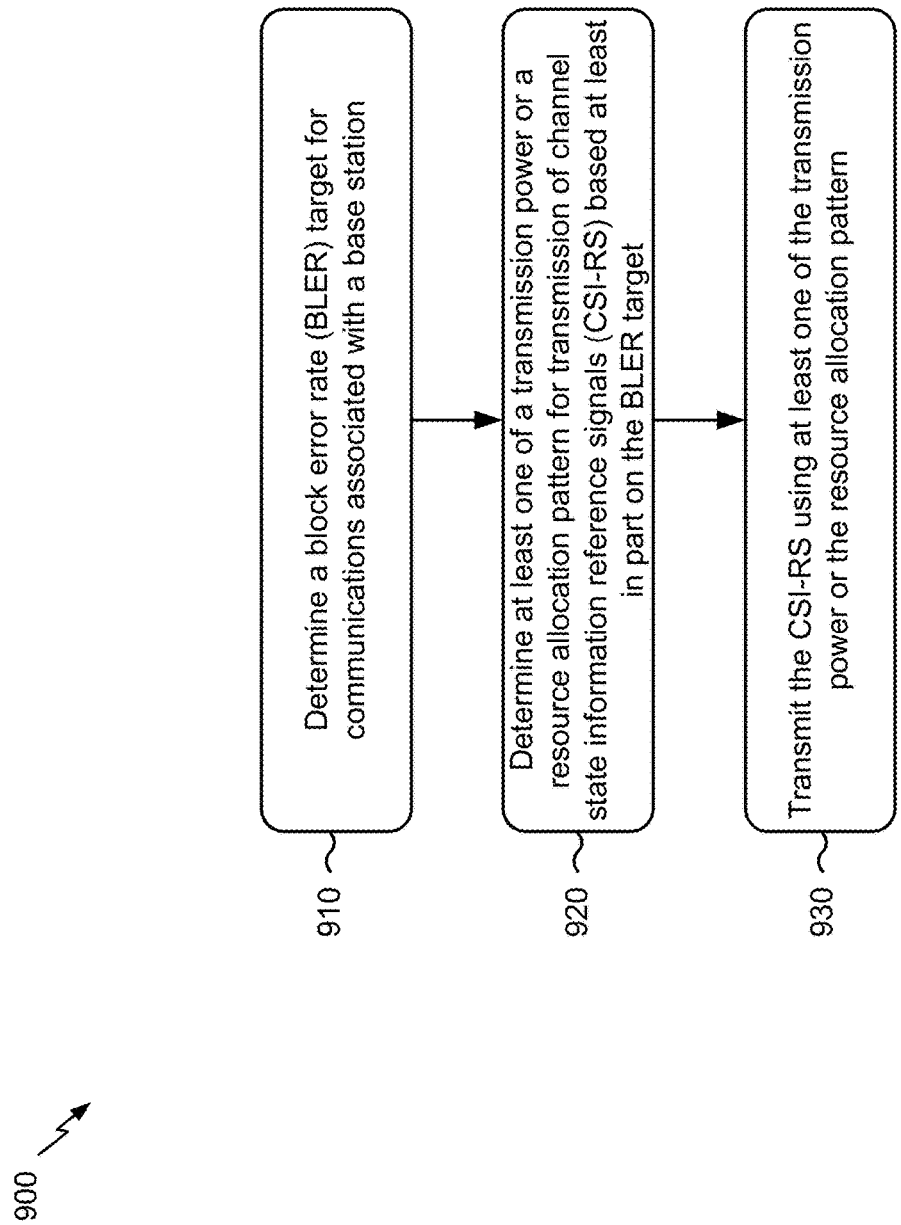

FIG. 9 is a diagram illustrating an example process 900 performed, for example, by a base station, in accordance with various aspects of the present disclosure. Example process 900 is an example where a base station (e.g., base station 110 and/or the like) performs operations relating to CQI reporting for URLLC.

As shown in FIG. 9, in some aspects, process 900 may include determining a block error rate (BLER) target for communications associated with the base station (block 910). For example, the base station (e.g., using controller/processor 240 and/or the like) may determine a BLER target for communications associated with the base station, as described above in connection with FIGS. 5-7.

As further shown in FIG. 9, in some aspects, process 900 may include determining at least one of a transmission power or a resource allocation pattern for transmission of channel state information reference signals (CSI-RS) based at least in part on the BLER target (block 920). For example, the base station (e.g., using controller/processor 240 and/or the like) may determine at least one of a transmission power or a resource allocation pattern for transmission of CSI-RS based at least in part on the BLER target, as described above in connection with FIGS. 5-7.

As further shown in FIG. 9, in some aspects, process 900 may include transmitting the CSI-RS using at least one of the transmission power or the resource allocation pattern (block 930). For example, the base station (e.g., using controller/processor 240, transmit processor 220, TX MIMO processor 230, MOD 232, antenna 234, and/or the like) may transmit the CSI-RS using at least one of the transmission power or the resource allocation pattern, as described above in connection with FIGS. 5-7.

Process 900 may include additional aspects, such as any single aspect or any combination of aspects described below and/or in connection with one or more other processes described elsewhere herein.

In a first aspect, the resource allocation pattern indicates more resources for the CSI-RS when the BLER target is lower, or the resource allocation pattern indicates fewer resources for the CSI-RS when the BLER target is higher. In a second aspect alone or in combination with the first aspect, the resource allocation pattern indicates that the CSI-RS are to be transmitted more frequently when the BLER target is lower, or the resource allocation pattern indicates that the CSI-RS are to be transmitted less frequently when the BLER target is higher. In a third aspect alone or in combination with any of the first through second aspects, the resource allocation pattern indicates that the CSI-RS are to be transmitted on a larger number of frequencies when the BLER target is lower, or the resource allocation pattern indicates that the CSI-RS are to be transmitted on a smaller number of frequencies when the BLER target is higher. In a fourth aspect alone or in combination with any of the first through third aspects, the CSI-RS are transmitted with a higher transmission power when the BLER target is lower, or the CSI-RS are transmitted with a lower transmission power when the BLER target is higher.

In a fifth aspect alone or in combination with any of the first through fourth aspects, the CSI-RS includes at least one of: a non-zero power (NZP) CSI-RS, an interference measurement resource (IMR), or some combination thereof. In a sixth aspect alone or in combination with any of the first through fifth aspects, the resource allocation pattern is determined based at least in part on a table, stored in memory of the base station, that indicates a mapping between a plurality of BLER targets and a corresponding plurality of resource allocation patterns.

In a seventh aspect alone or in combination with any of the first through sixth aspects, the base station may determine a number of bits to be used to indicate a CQI index based at least in part on the BLER target; may receive the CQI index based at least in part on transmitting the CSI-RS; and may decode the CQI index based at least in part on the determined number of bits. In an eighth aspect alone or in combination with any of the first through seventh aspects, the base station may determine a reporting timeline, associated with reporting a CQI report, based at least in part on the BLER target; and may monitor for the CQI report according to the reporting timeline, wherein the CQI report is received based at least in part on transmitting the CSI-RS.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
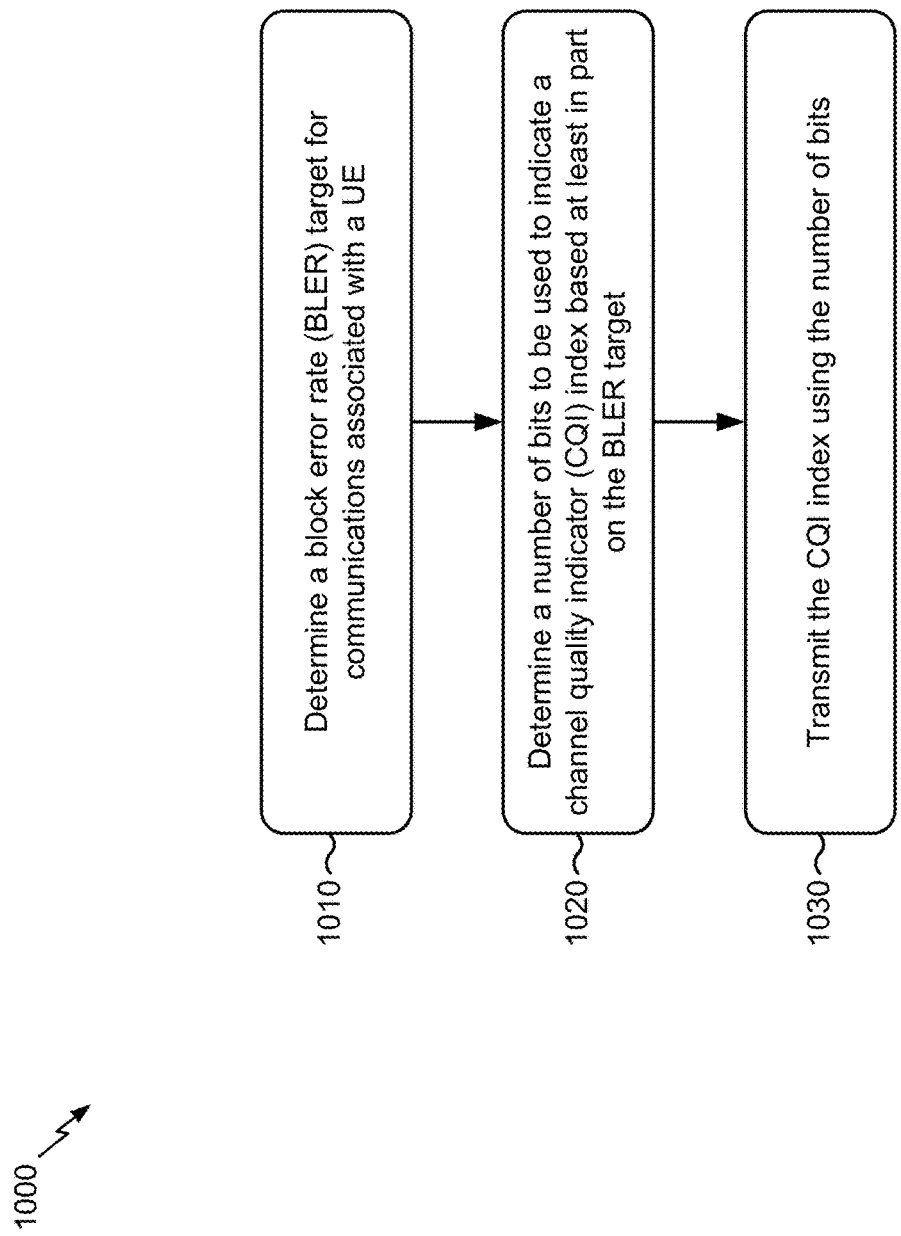

FIG. 10 is a diagram illustrating an example process 1000 performed, for example, by a UE, in accordance with various aspects of the present disclosure. Example process 1000 is an example where a UE (e.g., UE 120 and/or the like) performs operations relating to CQI reporting for URLLC.

As shown in FIG. 10, in some aspects, process 1000 may include determining a block error rate (BLER) target for communications associated with the UE (block 1010). For example, the UE (e.g., using controller/processor 280 and/or the like) may determine a BLER target for communications associated with the UE, as described above in connection with FIGS. 5-7.

As further shown in FIG. 10, in some aspects, process 1000 may include determining a number of bits to be used to indicate a channel quality indicator (CQI) index based at least in part on the BLER target (block 1020). For example, the UE (e.g., using controller/processor 280 and/or the like) may determine a number of bits to be used to indicate a CQI index based at least in part on the BLER target, as described above in connection with FIGS. 5-7.

As further shown in FIG. 10, in some aspects, process 1000 may include transmitting the CQI index using the number of bits (block 1030). For example, the UE (e.g., using controller/processor 280, transmit processor 264, TX MIMO processor 266, MOD 254, antenna 252, and/or the like) may transmit the CQI index using the number of bits, as described above in connection with FIGS. 5-7.

Process 1000 may include additional aspects, such as any single aspect or any combination of aspects described below and/or in connection with one or more other processes described elsewhere herein.

In a first aspect, the number of bits includes a smaller number of bits when the BLER target is lower, or the number of bits includes a larger number of bits when the BLER target is higher. In a second aspect alone or in combination with the first aspect, the smaller number of bits includes less than five bits. In a third aspect alone or in combination with any of the first through second aspects, the number of bits is determined based at least in part on a table, stored in memory of the UE, that indicates a mapping between a plurality of BLER targets and a corresponding plurality of number of bits to be used to indicate the CQI index.

In a fourth aspect alone or in combination with any of the first through third aspects, the UE may determine a resource allocation pattern for transmission of channel state information reference signals (CSI-RS) based at least in part on the BLER target; and may monitor one or more resources, indicated by the resource allocation pattern, for the CSI-RS, wherein the CQI index is determined based at least in part on the CSI-RS. In a fifth aspect alone or in combination with any of the first through fourth aspects, the UE may determine a reporting timeline, associated with reporting a CQI report, based at least in part on the BLER target; and may transmit the CQI report, including the CQI index, according to the reporting timeline.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
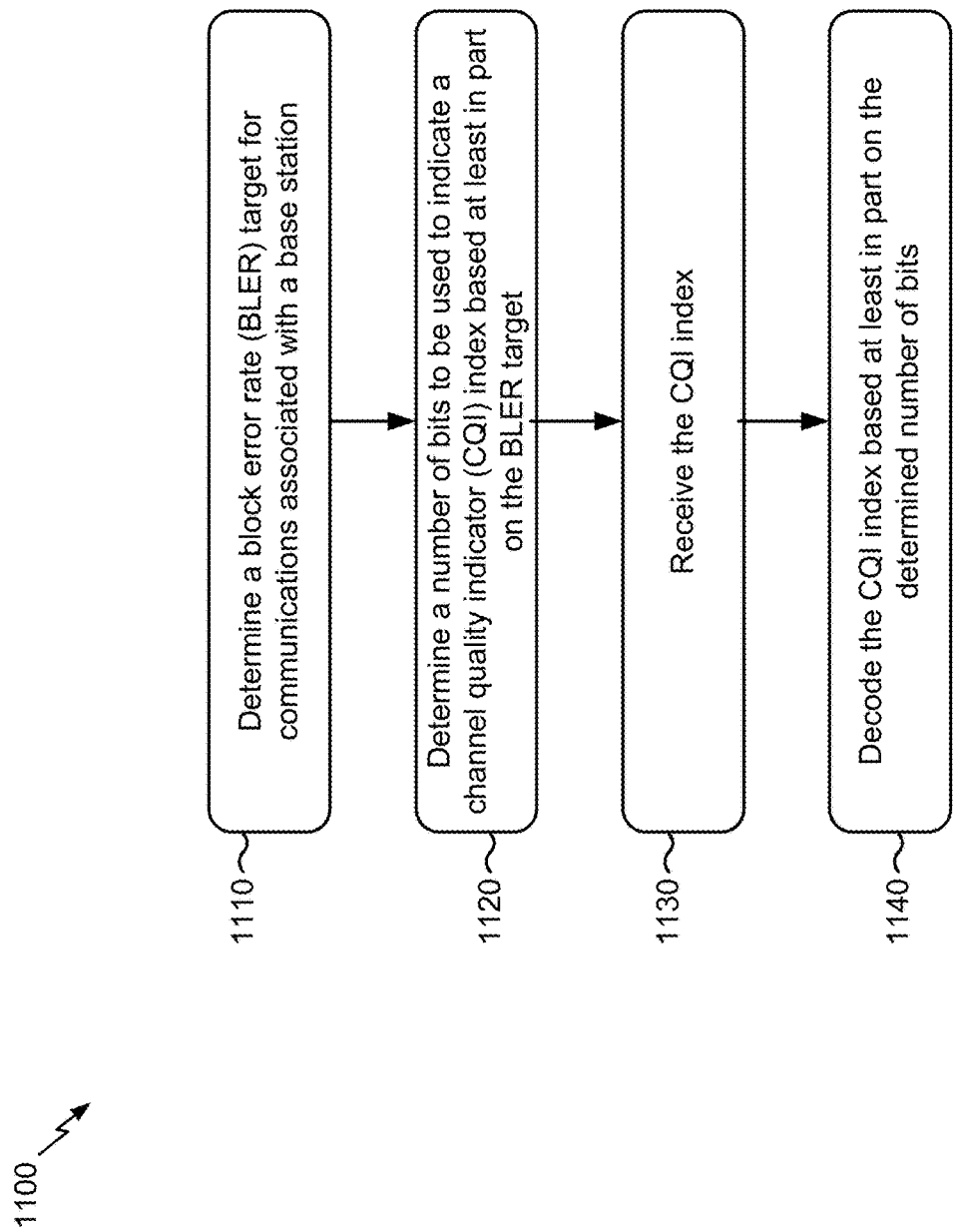

FIG. 11 is a diagram illustrating an example process 1100 performed, for example, by a base station, in accordance with various aspects of the present disclosure. Example process 1100 is an example where a base station (e.g., base station 110 and/or the like) performs operations relating to CQI reporting for URLLC.

As shown in FIG. 11, in some aspects, process 1100 may include determining a block error rate (BLER) target for communications associated with the base station (block 1110). For example, the base station (e.g., using controller/processor 240 and/or the like) may determine a BLER target for communications associated with the base station, as described above in connection with FIGS. 5-7.

As further shown in FIG. 11, in some aspects, process 1100 may include determining a number of bits to be used to indicate a channel quality indicator (CQI) index based at least in part on the BLER target (block 1120). For example, the base station (e.g., using controller/processor 240 and/or the like) may determine a number of bits to be used to indicate a CQI index based at least in part on the BLER target, as described above in connection with FIGS. 5-7.

As further shown in FIG. 11, in some aspects, process 1100 may include receiving the CQI index (block 1130). For example, the base station (e.g., using antenna 234, DEMOD 232, MIMO detector 236, receive processor 238, controller/processor 240, and/or the like) may receive the CQI index, as described above in connection with FIGS. 5-7.

As further shown in FIG. 11, in some aspects, process 1100 may include decoding the CQI index based at least in part on the determined number of bits (block 1140). For example, the base station (e.g., using controller/processor 240 and/or the like) may decode the CQI index based at least in part on the determined number of bits, as described above in connection with FIGS. 5-7.

Process 1100 may include additional aspects, such as any single aspect or any combination of aspects described below and/or in connection with one or more other processes described elsewhere herein.

In a first aspect, the number of bits includes a smaller number of bits when the BLER target is lower, or the number of bits includes a larger number of bits when the BLER target is higher. In a second aspect alone or in combination with the first aspect, the smaller number of bits includes less than five bits. In a third aspect alone or in combination with any of the first through second aspects, the number of bits is determined based at least in part on a table, stored in memory of the base station, that indicates a mapping between a plurality of BLER targets and a corresponding plurality of number of bits to be used to indicate the CQI index.

In a fourth aspect alone or in combination with any of the first through third aspects, the base station may determine at least one of a transmission power or a resource allocation pattern for transmission of channel state information reference signals (CSI-RS) based at least in part on the BLER target; and may transmit the CSI-RS using at least one of the transmission power or the resource allocation pattern, wherein the CQI index is received based at least in part on transmitting the CSI-RS. In a fifth aspect alone or in combination with any of the first through fourth aspects, the base station may determine a reporting timeline, associated with reporting a CQI report, based at least in part on the BLER target; and may monitor for the CQI report, including the CQI index, according to the reporting timeline.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
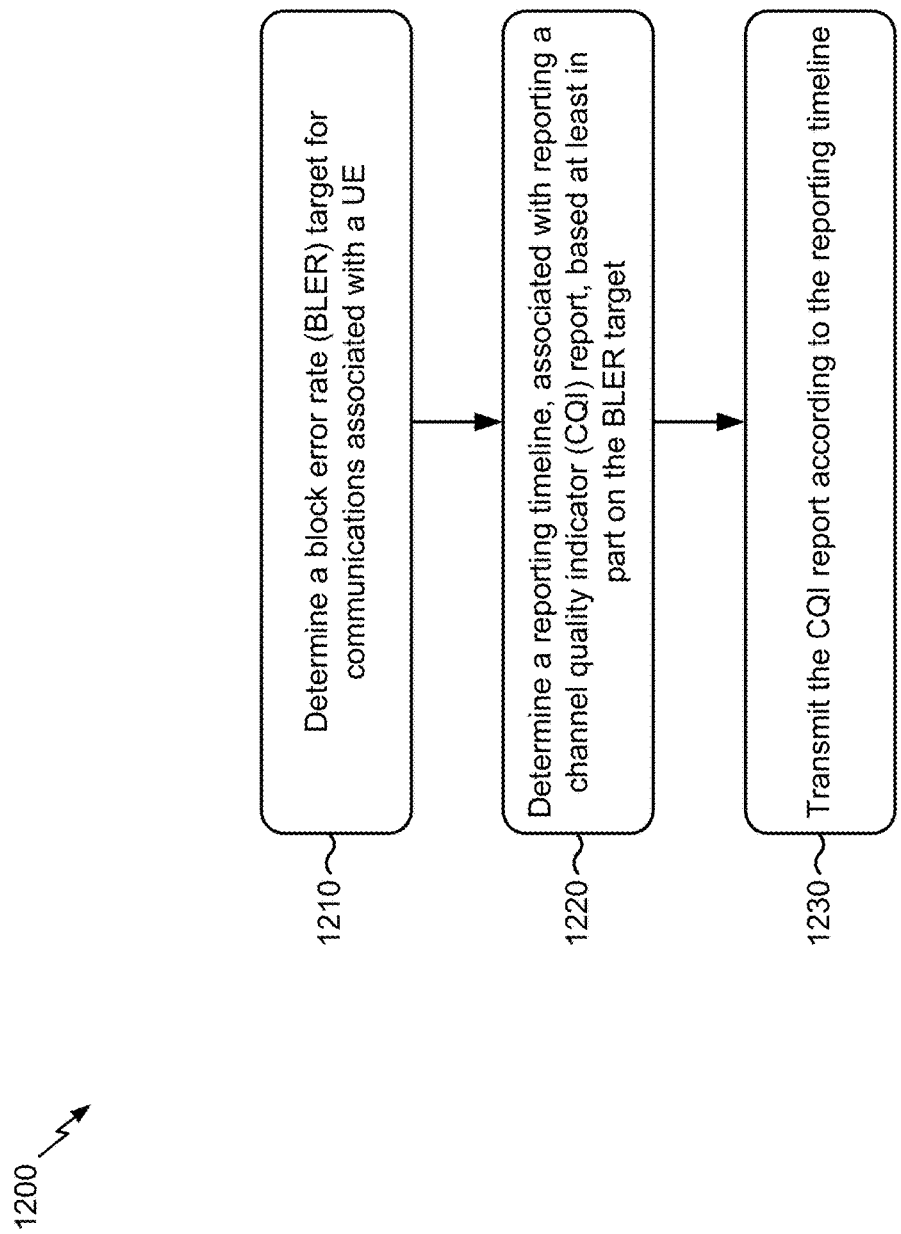

FIG. 12 is a diagram illustrating an example process 1200 performed, for example, by a UE, in accordance with various aspects of the present disclosure. Example process 1200 is an example where a UE (e.g., UE 120 and/or the like) performs operations relating to CQI reporting for URLLC.

As shown in FIG. 12, in some aspects, process 1200 may include determining a block error rate (BLER) target for communications associated with the UE (block 1210). For example, the UE (e.g., using controller/processor 280 and/or the like) may determine a BLER target for communications associated with the UE, as described above in connection with FIGS. 5-7.

As further shown in FIG. 12, in some aspects, process 1200 may include determining a reporting timeline, associated with reporting a channel quality indicator (CQI) report, based at least in part on the BLER target (block 1220). For example, the UE (e.g., using controller/processor 280 and/or the like) may determine a reporting timeline, associated with reporting a CQI report, based at least in part on the BLER target, as described above in connection with FIGS. 5-7.

As further shown in FIG. 12, in some aspects, process 1200 may include transmitting the CQI report according to the reporting timeline (block 1230). For example, the UE (e.g., using controller/processor 280, transmit processor 264, TX MIMO processor 266, MOD 254, antenna 252, and/or the like) may transmit the CQI report according to the reporting timeline, as described above in connection with FIGS. 5-7.

Process 1200 may include additional aspects, such as any single aspect or any combination of aspects described below and/or in connection with one or more other processes described elsewhere herein.

In a first aspect, the reporting timeline is a longer timeline when the BLER target is lower, or the reporting timeline is a shorter timeline when the BLER target is higher. In a second aspect alone or in combination with the first aspect, the reporting timeline is determined based at least in part on a table, stored in memory of the UE, that indicates a mapping between a plurality of BLER targets and a corresponding plurality of reporting timelines.

In a third aspect alone or in combination with any of the first through second aspects, the UE may determine a resource allocation pattern for transmission of channel state information reference signals (CSI-RS) based at least in part on the BLER target; and may monitor one or more resources, indicated by the resource allocation pattern, for the CSI-RS, wherein the CQI report is generated based at least in part on the CSI-RS. In a fourth aspect alone or in combination with any of the first through third aspects, the UE may determine a number of bits to be used to indicate a CQI index based at least in part on the BLER target; and may transmit the CQI index, in the CQI report, using the number of bits.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, by a base station, in accordance with various aspects of the present disclosure. Example process 1300 is an example where a base station (e.g., base station 110 and/or the like) performs operations relating to CQI reporting for URLLC.

As shown in FIG. 13, in some aspects, process 1300 may include determining a block error rate (BLER) target for communications associated with the base station (block 1310). For example, the base station (e.g., using controller/processor 240 and/or the like) may determine a BLER target for communications associated with the base station, as described above in connection with FIGS. 5-7.

As further shown in FIG. 13, in some aspects, process 1300 may include determining a reporting timeline, associated with reporting a channel quality indicator (CQI) report, based at least in part on the BLER target (block 1320). For example, the base station (e.g., using controller/processor 240 and/or the like) may determine a reporting timeline, associated with reporting a CQI report, based at least in part on the BLER target, as described above in connection with FIGS. 5-7.

As further shown in FIG. 13, in some aspects, process 1300 may include monitoring for the CQI report according to the reporting timeline (block 1330). For example, the base station (e.g., using antenna 234, DEMOD 232, MIMO detector 236, receive processor 238, controller/processor 240, and/or the like) may monitor for the CQI report according to the reporting timeline, as described above in connection with FIGS. 5-7.

Process 1300 may include additional aspects, such as any single aspect or any combination of aspects described below and/or in connection with one or more other processes described elsewhere herein.

In a first aspect, the reporting timeline is a longer timeline when the BLER target is lower, or the reporting timeline is a shorter timeline when the BLER target is higher. In a second aspect alone or in combination with the first aspect, the reporting timeline is determined based at least in part on a table, stored in memory of the base station, that indicates a mapping between a plurality of BLER targets and a corresponding plurality of reporting timelines.

In a third aspect alone or in combination with any of the first through second aspects, the base station may determine at least one of a transmission power or a resource allocation pattern for transmission of channel state information reference signals (CSI-RS) based at least in part on the BLER target; and may transmit the CSI-RS using at least one of the transmission power or the resource allocation pattern, wherein the CQI report is received based at least in part on transmitting the CSI-RS. In a fourth aspect alone or in combination with any of the first through third aspects, the base station may determine a number of bits to be used to indicate a CQI index based at least in part on the BLER target; may receive the CQI index in the CQI report; and may decode the CQI index based at least in part on the determined number of bits.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining, by the UE, a block error rate (BLER) target for communications associated with the UE;
   determining, by the UE, a resource allocation pattern for transmission of channel state information reference signals (CSI-RS) based at least in part on the BLER target, wherein the resource allocation pattern indicates a number of the CSI-RS to be transmitted; and
   monitoring, by the UE, one or more resources, indicated by the resource allocation pattern, for the CSI-RS.

2. The method of claim 1, wherein the resource allocation pattern indicates more resources for the CSI-RS when the BLER target is lower, or wherein the resource allocation pattern indicates fewer resources for the CSI-RS when the BLER target is higher.

3. The method of claim 1, wherein the resource allocation pattern indicates that the CSI-RS are to be transmitted more frequently when the BLER target is lower, or wherein the resource allocation pattern indicates that the CSI-RS are to be transmitted less frequently when the BLER target is higher.

4. The method of claim 1, wherein the resource allocation pattern indicates that the CSI-RS are to be transmitted on a larger number of frequency resources when the BLER target is lower, or wherein the resource allocation pattern indicates that the CSI-RS are to be transmitted on a smaller number of frequency resources when the BLER target is higher.

5. The method of claim 1, wherein the CSI-RS includes at least one of:
   a non-zero power (NZP) CSI-RS,
   an interference measurement resource (IMR), or
   some combination thereof.

6. The method of claim 1, wherein the resource allocation pattern is determined based at least in part on a table, stored in memory of the UE, that indicates a mapping between a plurality of BLER targets and a corresponding plurality of resource allocation patterns.

7. The method of claim 1, further comprising:
   determining a number of bits to be used to indicate a channel quality indicator (CQI) index based at least in part on the BLER target; and
   transmitting the CQI index using the number of bits, wherein the CQI index is determined based at least in part on the CSI-RS.

8. The method of claim 1, further comprising:
   determining a reporting timeline, associated with reporting a channel quality indicator (CQI) report, based at least in part on the BLER target; and
   transmitting the CQI report according to the reporting timeline, wherein the CQI report is generated based at least in part on the CSI-RS.

9. A method of wireless communication performed by a user equipment (UE), comprising:
   determining, by the UE, a block error rate (BLER) target for communications associated with the UE;
   determining, by the UE, a resource allocation pattern for transmission of channel state information reference signals (CSI-RS) based at least in part on the BLER target, wherein the resource allocation pattern indicates a number of the CSI-RS to be transmitted;
   determining, by the UE, at least one of a number of bits to be used to indicate a channel quality indicator (CQI) index or a reporting timeline associated with reporting the CQI index based at least in part on the BLER target; and
   transmitting, by the UE, the CQI index using at least one of the number of bits or the reporting timeline.

10. The method of claim 9, wherein the number of bits includes a smaller number of bits when the BLER target is lower, or wherein the number of bits includes a larger number of bits when the BLER target is higher.

11. The method of claim 10, wherein the smaller number of bits includes less than five bits.

12. The method of claim 9, wherein the number of bits is determined based at least in part on a table, stored in memory of the UE, that indicates a mapping between a plurality of BLER targets and a corresponding plurality of number of bits to be used to indicate the CQI index.

13. The method of claim 9, further comprising:
    monitoring one or more resources, indicated by the resource allocation pattern, for the CSI-RS, wherein the CQI index is determined based at least in part on the CSI-RS.

14. The method of claim 9, wherein the reporting timeline is a longer timeline when the BLER target is lower, or wherein the reporting timeline is a shorter timeline when the BLER target is higher.

15. The method of claim 9, wherein the reporting timeline is determined based at least in part on a table, stored in memory of the UE, that indicates a mapping between a plurality of BLER targets and a corresponding plurality of reporting timelines.

16. The method of claim 9, further comprising:
    monitoring one or more resources, indicated by the resource allocation pattern, for the CSI-RS, wherein the CQI report is generated based at least in part on the CSI-RS.

17. A user equipment (UE) for wireless communication, comprising:
    memory;
    a transmitter; and
    one or more processors coupled to the memory, the memory and the one or more processors configured to:
       determine, by the UE, a block error rate (BLER) target for communications associated with the UE;
       determine, by the UE, a resource allocation pattern for transmission of channel state information reference signals (CSI-RS) based at least in part on the BLER target, wherein the resource allocation pattern indicates a number of the CSI-RS to be transmitted; and
       monitor, by the UE, one or more resources, indicated by the resource allocation pattern, for the CSI-RS.

18. The UE of claim 17, wherein the resource allocation pattern indicates more resources for the CSI-RS when the BLER target is lower, or wherein the resource allocation pattern indicates fewer resources for the CSI-RS when the BLER target is higher.

19. The UE of claim 17, wherein the resource allocation pattern indicates that the CSI-RS are to be transmitted more frequently when the BLER target is lower, or wherein the resource allocation pattern indicates that the CSI-RS are to be transmitted less frequently when the BLER target is higher.

20. The UE of claim 17, wherein the resource allocation pattern indicates that the CSI-RS are to be transmitted on a larger number of frequency resources when the BLER target is lower, or wherein the resource allocation pattern indicates that the CSI-RS are to be transmitted on a smaller number of frequency resources when the BLER target is higher.

21. The UE of claim 17, wherein the one or more processors are further configured to:
    determine at least one of a number of bits to be used to indicate a channel quality indicator (CQI) index or a reporting timeline associated with reporting the CQI index based at least in part on the BLER target; and
    transmit the CQI index using at least one of the number of bits or the reporting timeline, wherein the CQI index is determined based at least in part on the CSI-RS.

22. A user equipment (UE) for wireless communication, comprising:
    memory; and
    one or more processors coupled to the memory, the memory and the one or more processors configured to:
        determine, by the UE, a block error rate (BLER) target for communications associated with the UE;
        determine, by the UE, a resource allocation pattern for transmission of channel state information reference signals (CSI-RS) based at least in part on the BLER target, wherein the resource allocation pattern indicates a number of the CSI-RS to be transmitted;
        determine, by the UE, at least one of a number of bits to be used to indicate a channel quality indicator (CQI) index or a reporting timeline associated with reporting the CQI index based at least in part on the BLER target; and
        transmit, by the UE, the CQI index using at least one of the number of bits or the reporting timeline.

23. The UE of claim 22, wherein the number of bits includes a smaller number of bits when the BLER target is lower, or wherein the number of bits includes a larger number of bits when the BLER target is higher.

24. The UE of claim 23, wherein the smaller number of bits includes less than five bits.

25. The UE of claim 22, wherein the number of bits is determined based at least in part on a table, stored in the memory of the UE, that indicates a mapping between a plurality of BLER targets and a corresponding plurality of number of bits to be used to indicate the CQI index.

26. The UE of claim 22, wherein the one or more processors are further configured to:
    monitor one or more resources, indicated by the resource allocation pattern, for the CSI-RS, wherein the CQI index is determined based at least in part on the CSI-RS.

27. The UE of claim 22, wherein the reporting timeline is a longer timeline when the BLER target is lower, or wherein the reporting timeline is a shorter timeline when the BLER target is higher.

28. The UE of claim 22, wherein the reporting timeline is determined based at least in part on a table that indicates a mapping between a plurality of BLER targets and a corresponding plurality of reporting timelines.

29. The UE of claim 28, wherein the table is stored in the memory.

30. The UE of claim 22, wherein the one or more processors are further configured to:
    monitor one or more resources, indicated by the resource allocation pattern, for the CSI-RS, wherein the CQI index is determined based at least in part on the CSI-RS.

* * * * *